(12) United States Patent
Hu et al.

(10) Patent No.: US 10,496,614 B2
(45) Date of Patent: Dec. 3, 2019

(54) DDL PROCESSING IN SHARED DATABASES

(71) Applicant: Oracle International Corporation, Redwood Shores, CA (US)

(72) Inventors: Wei-Ming Hu, Palo Alto, CA (US); Mark Dilman, Sunnyvale, CA (US); Leonid Novak, Castro Valley, CA (US); Stephen Ball, Dublin, CA (US); Ghazi Nourdine Benadjaoud, Pleasanton, CA (US)

(73) Assignee: Oracle International Corporation, Redwood Shores, CA (US)

( * ) Notice: Subject to any disclaimer, the term of this patent is extended or adjusted under 35 U.S.C. 154(b) by 444 days.

(21) Appl. No.: 15/268,318

(22) Filed: Sep. 16, 2016

(65) Prior Publication Data

US 2017/0103092 A1    Apr. 13, 2017

Related U.S. Application Data

(60) Provisional application No. 62/238,193, filed on Oct. 7, 2015.

(51) Int. Cl.
*G06F 16/00* (2019.01)
*G06F 16/21* (2019.01)
(Continued)

(52) U.S. Cl.
CPC ......... *G06F 16/213* (2019.01); *G06F 16/217* (2019.01); *G06F 16/221* (2019.01);
(Continued)

(58) Field of Classification Search
CPC ......... G06F 17/30584; G06F 17/30297; G06F 17/30306; G06F 17/30315; G06F 17/30336; G06F 17/30339; G06F 17/30477; G06F 17/30545; G06F 17/30554; G06F 17/3056; G06F 17/30575; G06F 16/211; G06F 16/278; G06F 16/2282; G06F 16/213; G06F 16/252; G06F 16/27; G06F 16/2365

See application file for complete search history.

(56) References Cited

U.S. PATENT DOCUMENTS

| 8,332,207 B2 | 12/2012 | Brants |
| 8,700,683 B2 | 4/2014 | Cooney |

(Continued)

FOREIGN PATENT DOCUMENTS

WO    WO 2016/172195 A1    10/2016

OTHER PUBLICATIONS

Hu, U.S. Appl. No. 5/267,395, filed Sep. 16, 2016, Office Action, dated Jul. 11, 2018.

(Continued)

*Primary Examiner* — Merilyn P Nguyen
(74) *Attorney, Agent, or Firm* — Hickman Palermo Becker Bingham LLP

(57) ABSTRACT

Techniques are provided for creating, organizing, and maintaining a sharded database. A sharded database can be created using user-defined sharding, system-managed sharding, or composite sharding. The sharded database is implemented with relational database techniques. The techniques described can be used for load distribution, organization, query processing, and schema propagation in a sharded database.

20 Claims, 20 Drawing Sheets

(51) Int. Cl.
    *G06F 16/27* (2019.01)
    *G06F 16/22* (2019.01)
    *G06F 16/248* (2019.01)
    *G06F 16/25* (2019.01)
    *G06F 16/2455* (2019.01)
    *G06F 16/2458* (2019.01)

(52) U.S. Cl.
    CPC ...... *G06F 16/2272* (2019.01); *G06F 16/2282* (2019.01); *G06F 16/248* (2019.01); *G06F 16/2455* (2019.01); *G06F 16/2471* (2019.01); *G06F 16/252* (2019.01); *G06F 16/27* (2019.01); *G06F 16/278* (2019.01)

(56) References Cited

U.S. PATENT DOCUMENTS

| | | | |
|---|---|---|---|
| 8,819,068 B1 * | 8/2014 | Knote | G06F 16/2282 707/790 |
| 8,903,871 B2 | 12/2014 | Hwang | |
| 8,965,921 B2 | 2/2015 | Gajic | |
| 9,122,532 B2 | 9/2015 | Kosuru | |
| 9,128,965 B1 * | 9/2015 | Yanacek | G06F 16/213 |
| 9,135,269 B2 | 9/2015 | Shetty | |
| 9,396,275 B2 | 7/2016 | Sandholm | |
| 9,633,051 B1 * | 4/2017 | Maccanti | G06F 11/1451 |
| 9,659,040 B1 * | 5/2017 | Bellingan | G06F 11/36 |
| 9,875,272 B1 * | 1/2018 | Jhingran | G06F 16/2365 |
| 10,198,495 B1 * | 2/2019 | Bailey | G06F 16/278 |
| 2005/0038801 A1 | 2/2005 | Colrain et al. | |
| 2011/0196855 A1 | 8/2011 | Wable | |
| 2012/0254175 A1 | 10/2012 | Horowitz et al. | |
| 2012/0278323 A1 | 11/2012 | Chattopadhyay | |
| 2014/0101100 A1 | 4/2014 | Hu et al. | |
| 2014/0122510 A1 | 5/2014 | Namkoong | |
| 2014/0156632 A1 * | 6/2014 | Yu | G06F 16/24545 707/713 |
| 2014/0324910 A1 | 10/2014 | De Lavarene et al. | |
| 2014/0372702 A1 | 12/2014 | Subramanyam | |
| 2015/0026213 A1 | 1/2015 | Hegde et al. | |
| 2015/0089514 A1 | 3/2015 | Grewal | |
| 2015/0154200 A1 * | 6/2015 | Lightner | G06F 16/285 707/693 |
| 2015/0227521 A1 * | 8/2015 | Levari | G06F 17/30584 707/694 |
| 2015/0254307 A1 * | 9/2015 | Johnson | G06F 16/2425 707/763 |
| 2015/0254325 A1 | 9/2015 | Stringham | |
| 2015/0293945 A1 * | 10/2015 | Amrhein | G06F 16/278 707/722 |
| 2016/0171511 A1 * | 6/2016 | Goel | G06Q 50/01 705/7.29 |
| 2016/0191509 A1 | 6/2016 | Bestler | |
| 2016/0306832 A1 | 10/2016 | Hegde et al. | |
| 2016/0306854 A1 | 10/2016 | Hegde et al. | |
| 2017/0083598 A1 | 3/2017 | Guney | |
| 2017/0103094 A1 | 4/2017 | Hu | |
| 2017/0103098 A1 | 4/2017 | Hu | |
| 2017/0103116 A1 | 4/2017 | Hu | |

OTHER PUBLICATIONS

Hu, U.S. Appl. No. 15/268,438, filed Sep. 16, 2016, Office Action, dated Sep. 6, 2018.

Hu, U.S. Appl. No. 15/268,108, filed Sep. 16, 2016, Office Action, dated Sep. 17, 2018.

Hu, U.S. Appl. No. 15/268,108, filed Sep. 16, 2016, Notice of Allowance, dated Jan. 28, 2019.

Hu, U.S. Appl. No. 15/267,395, filed Sep. 16, 2016, Notice of Allowance, dated Dec. 3, 2018.

Hu, U.S. Appl. No. 15/268,438, filed Sep. 16, 2016, Notice of Allowance, dated Feb. 12, 2019.

* cited by examiner

Customers 310

| CustNo | Name | Address | Location | Class |
|---|---|---|---|---|
| 123 | Mary | 100 Main St. | us3 | Gold |
| 456 | John | 300 Pine Ave | us1 | Silver |
| 999 | Peter | 453 42nd St | us2 | Bronze |

Orders 312

| OrderNo | CustNo | OrderDate |
|---|---|---|
| 4001 | 123 | 14-FEB-2013 |
| 4002 | 456 | 09-MAR-2013 |
| 4003 | 456 | 05-APR-2013 |
| 4004 | 123 | 27-MAY-2013 |
| 4005 | 999 | 01-SEP-2013 |

Line Items 316

| LineNo | OrderNo | StockNo | Quantity |
|---|---|---|---|
| 40011 | 4001 | 05683022 | 1 |
| 40012 | 4001 | 45423509 | 4 |
| 40013 | 4001 | 68584904 | 1 |
| 40021 | 4002 | 05683022 | 1 |
| 40022 | 4002 | 45423509 | 3 |
| 40031 | 4003 | 80345330 | 16 |
| 40041 | 4004 | 45423509 | 1 |
| 40042 | 4004 | 68584904 | 2 |
| 40051 | 4005 | 80345330 | 12 |

Customers

| CustNo | Name | Address | Location | Class |
|---|---|---|---|---|
| 123 | Mary | 100 Main St. | us3 | Gold |

Orders — 322

| OrderNo | CustNo | OrderDate |
|---|---|---|
| 4001 | 123 | 14-FEB-2013 |
| 4004 | 123 | 27-MAY-2013 |

Line Items — 324 / 326

| LineNo | OrderNo | StockNo | Quantity |
|---|---|---|---|
| 40011 | 4001 | 05683022 | 1 |
| 40012 | 4001 | 45423509 | 4 |
| 40013 | 4001 | 68584904 | 1 |
| 40041 | 4004 | 45423509 | 1 |
| 40042 | 4004 | 68584904 | 2 |

330

Customers

| CustNo | Name | Address | Location | Class |
|---|---|---|---|---|
| 456 | John | 300 Pine Ave | us1 | Silver |

Orders — 332

| OrderNo | CustNo | OrderDate |
|---|---|---|
| 4002 | 456 | 09-MAR-2013 |
| 4003 | 456 | 05-APR-2013 |

Line Items — 334 / 336

| LineNo | OrderNo | StockNo | Quantity |
|---|---|---|---|
| 40021 | 4002 | 05683022 | 1 |
| 40022 | 4002 | 45423509 | 3 |
| 40031 | 4003 | 80345330 | 16 |

340

Customers

| CustNo | Name | Address | Location | Class |
|---|---|---|---|---|
| 999 | Peter | 453 42nd St | us2 | Bronze |

Orders — 342

| OrderNo | CustNo | OrderDate |
|---|---|---|
| 4005 | 999 | 01-SEP-2013 |

Line Items — 344 / 346

| LineNo | OrderNo | StockNo | Quantity |
|---|---|---|---|
| 40051 | 4005 | 80345330 | 12 |

Customers

| CustNo | Name | Address | Location | Class |
|---|---|---|---|---|
| 123 | Mary | 100 Main St. | us3 | Gold |
| 456 | John | 300 Pine Ave | us1 | Silver |
| 999 | Peter | 453 42nd St | us2 | Bronze |

412

Orders

| OrderNo | CustNo | OrderDate |
|---|---|---|
| 4001 | 123 | 14-FEB-2013 |
| 4002 | 456 | 09-MAR-2013 |
| 4003 | 456 | 05-APR-2013 |
| 4004 | 123 | 27-MAY-2013 |
| 4005 | 999 | 01-SEP-2013 |

414

Line Items

| LineNo | OrderNo | StockNo | Quantity |
|---|---|---|---|
| 40011 | 4001 | 05683022 | 1 |
| 40012 | 4001 | 45423509 | 4 |
| 40013 | 4001 | 68584904 | 1 |
| 40021 | 4002 | 05683022 | 1 |
| 40022 | 4002 | 45423509 | 3 |
| 40031 | 4003 | 80345330 | 16 |
| 40041 | 4004 | 45423509 | 1 |
| 40042 | 4004 | 68584904 | 2 |
| 40051 | 4005 | 80345330 | 12 |

416

Products

| SKU | Product |
|---|---|
| 100 | Coil |
| 101 | Piston |
| 102 | Belt |

Customers

| CustNo | Name | Address | Location | Class |
|---|---|---|---|---|
| 123 | Mary | 100 Main St. | us3 | Gold |

422

Orders

| OrderNo | CustNo | OrderDate |
|---|---|---|
| 4001 | 123 | 14-FEB-2013 |
| 4004 | 123 | 27-MAY-2013 |

424

Line Items

| LineNo | OrderNo | StockNo | Quantity |
|---|---|---|---|
| 40011 | 4001 | 05683022 | 1 |
| 40012 | 4001 | 45423509 | 4 |
| 40013 | 4001 | 68584904 | 1 |
| 40041 | 4004 | 45423509 | 1 |
| 40042 | 4004 | 68584904 | 2 |

426

Products

| SKU | Product |
|---|---|
| 100 | Coil |
| 101 | Piston |
| 102 | Belt |

418

430

Customers

| CustNo | Name | Address | Location | Class |
|---|---|---|---|---|
| 456 | John | 300 Pine Ave | us1 | Silver |

432

Orders

| OrderNo | CustNo | OrderDate |
|---|---|---|
| 4002 | 456 | 09-MAR-2013 |
| 4003 | 456 | 05-APR-2013 |

434

Line Items

| LineNo | OrderNo | StockNo | Quantity |
|---|---|---|---|
| 40021 | 4002 | 05683022 | 1 |
| 40022 | 4002 | 45423509 | 3 |
| 40031 | 4003 | 80345330 | 16 |

436

Products

| SKU | Product |
|---|---|
| 100 | Coil |
| 101 | Piston |
| 102 | Belt |

418

440

Customers

| CustNo | Name | Address | Location | Class |
|---|---|---|---|---|
| 999 | Peter | 453 42nd St | us2 | Bronze |

442

Orders

| OrderNo | CustNo | OrderDate |
|---|---|---|
| 4005 | 999 | 01-SEP-2013 |

444

Line Items

| LineNo | OrderNo | StockNo | Quantity |
|---|---|---|---|
| 40051 | 4005 | 80345330 | 12 |

446

Products

| SKU | Product |
|---|---|
| 100 | Coil |
| 101 | Piston |
| 102 | Belt |

418

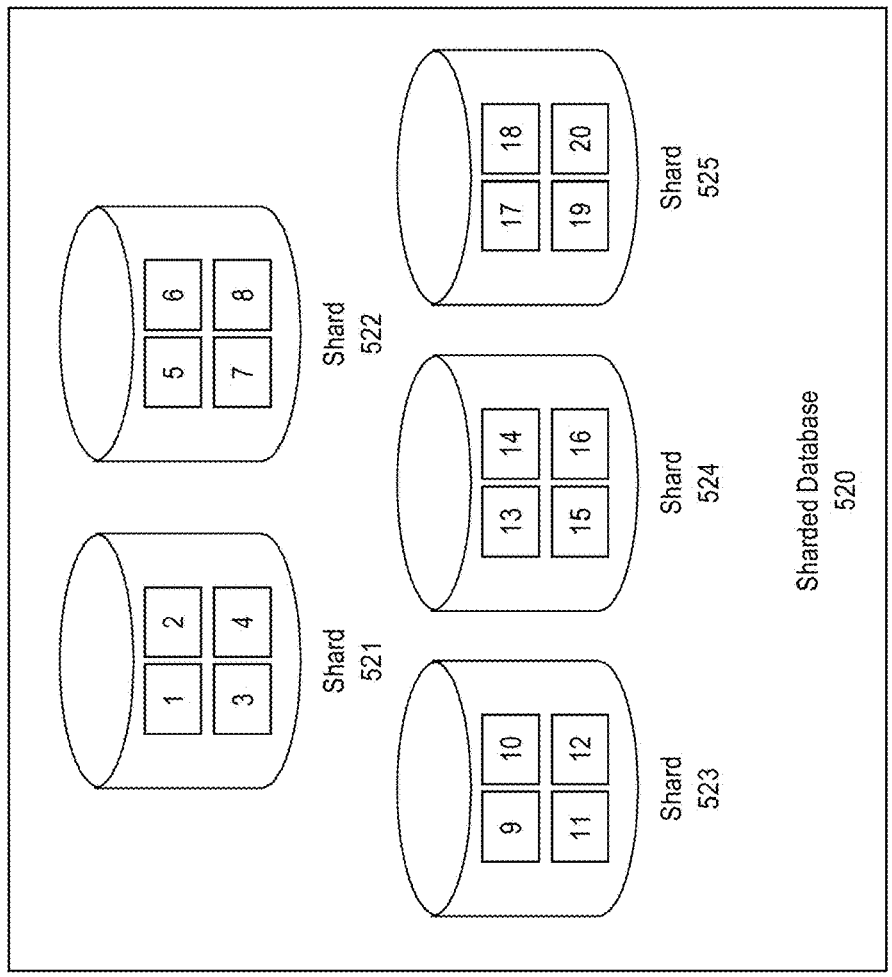
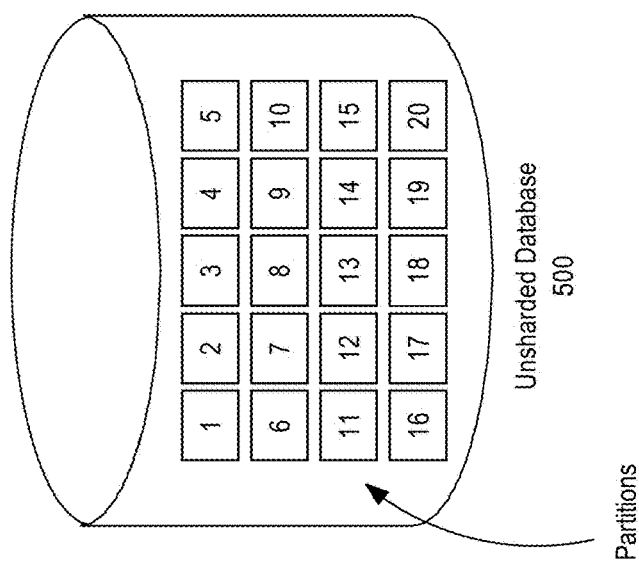
FIG. 5

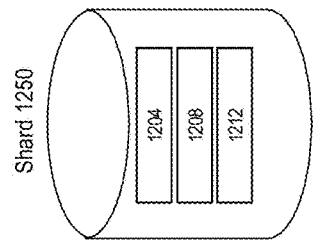
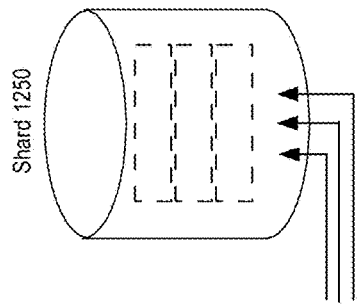
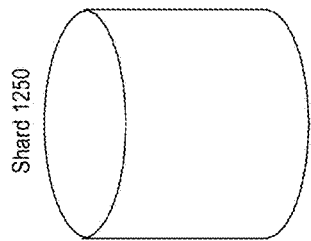
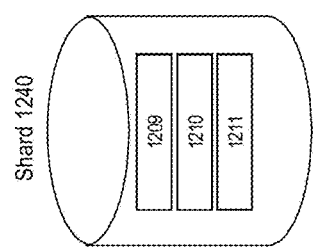
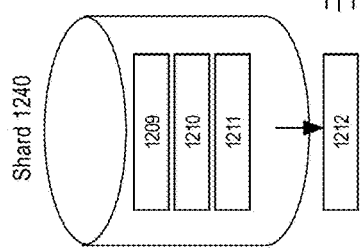
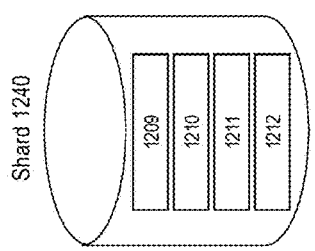
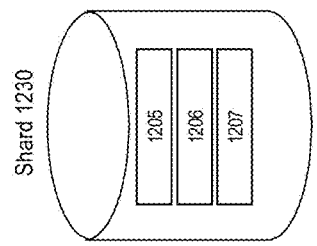
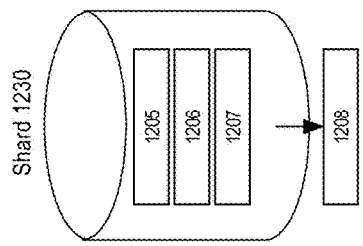
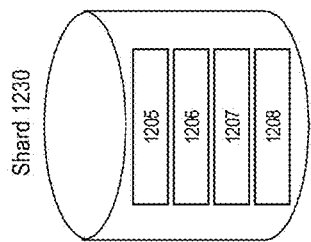
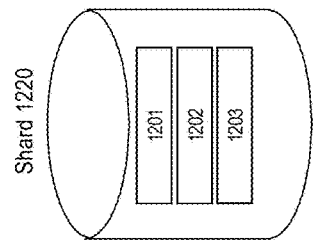
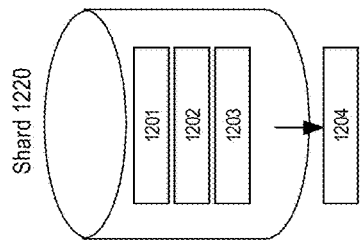
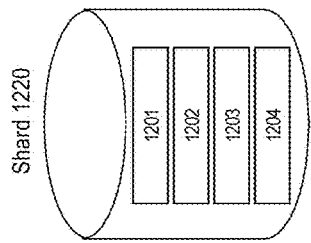
FIG. 12A          FIG. 12B          FIG. 12C

DDL PROCESSING IN SHARED DATABASES

CROSS-REFERENCE TO RELATED APPLICATIONS; BENEFIT CLAIM

This application claims the benefit of Provisional Application No. 62/238,193, filed Oct. 7, 2015, the entire contents of which are hereby incorporated by reference as if fully set forth herein, under 35 U.S.C. § 119(e). This application is related to U.S. patent application Ser. No. 15/267,395 entitled "Relational Database Organization for Sharding", filed Sep. 16, 2016, the entire contents of which are hereby incorporated by reference as if fully set forth herein. This application is related to U.S. patent application Ser. No. 15/268,108 entitled "Request Routing and Query Processing in a Sharded Database", filed Sep. 16, 2016, the entire contents of which are hereby incorporated by reference as if fully set forth herein. This application is related to U.S. patent application Ser. No. 15/268,438 entitled "Composite Sharding", filed Sep. 16, 2016, the entire contents of which are hereby incorporated by reference as if fully set forth herein.

TECHNICAL FIELD

The present disclosure relates to database systems. More specifically, the disclosure relates to relational database organization for sharding.

BACKGROUND

Database systems that store increasingly large amounts of data are becoming more and more prevalent. For example, online transaction processing (OLTP) systems, such as e-commerce, mobile, social, and Software-as-a-Service (SaaS) system, typically require large database storage. Example applications for OLTP systems include, but are not limited to, large billing systems, ticketing systems, online financial services, media companies, online information services, and social media companies. Given the significant amount of data stored by these database systems, storing all the data on a single database instance is not practical, as the amount of data can utilize significant computing resources, such as processors, memory, and storage.

Furthermore, non-relational databases, sometimes referred to as NoSQL databases, do not provide the fully featured benefits of a relational database. For example, NoSQL databases do not offer the same schema control, atomicity, consistency, isolation, durability, or fully-featured structured query language (SQL) of a relational database.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The example embodiment(s) of the present invention are illustrated by way of example, and not in way by limitation, in the figures of the accompanying drawings and in which like reference numerals refer to similar elements and in which:

FIGS. 3A and 3B illustrate examples of a table family, according to one embodiment.

FIGS. 4A and 4B illustrate examples of a duplicated table, according to one embodiment.

FIG. 5 illustrates an example of sharding as a form of distributed partitioning, according to one embodiment.

FIGS. 12A, 12B, and 12C illustrate an example of resharding, according to one embodiment.

DESCRIPTION OF THE EXAMPLE EMBODIMENT(S)

In the following description, for the purposes of explanation, numerous specific details are set forth in order to provide a thorough understanding of the example embodiment(s) of the present invention. It will be apparent, however, that the example embodiment(s) may be practiced without these specific details. In other instances, well-known structures and devices are shown in block diagram form in order to avoid unnecessarily obscuring the example embodiment(s).

General Overview

Horizontal partitioning is a technique of decomposing a single larger table into smaller, more manageable subsets of information, called "partitions." Sharding is a data tier architecture where data is horizontally partitioned across independent database instances, where each independent database instance is referred to as a "shard." A collection of shards, together, makes up a single logical database which is referred to as a "sharded database" ("SDB"). Logically, a sharded database can be accessible to a client application just like a traditional unsharded database. However, tables in a sharded database are horizontally partitioned across shards.

Figure 1:
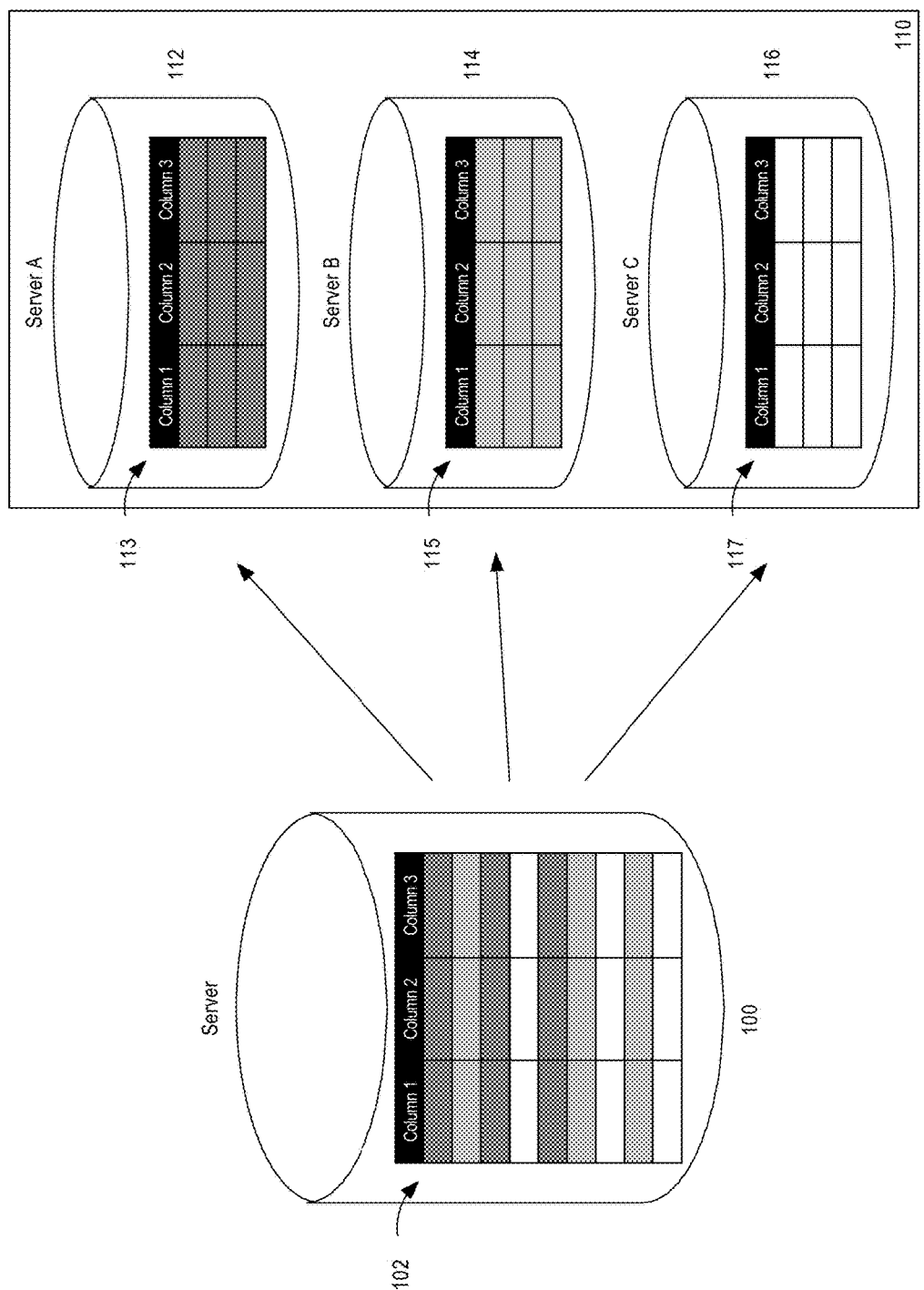
FIG. 1 illustrates examples of an unsharded database and a sharded database, according to one embodiment.

FIG. 1 illustrates an example of an unsharded database 100 and a sharded database 110. Unsharded database 100 is a relational database and includes table 102. All of the contents of table 102 are stored in the same unsharded database 100, and thus use the same computing resources, such as processors, memory, and disk space.

Sharded database 110, however, depicts an alternative configuration using sharding techniques. Sharded database 110, includes three shards 112, 114, and 116. Each of the shards 112, 114, and 116 is its own database instance and includes its own tables 113, 115, and 117, respectively. However, in sharded database 110, table 102 has been horizontally partitioned across shards 112, 114, and 116 into tables 113, 115, and 117. Horizontal partitioning in a sharded database involves splitting a database table, such as table 102, across shards so that each shard contains a subset of rows of table 102. In this example, tables 113, 115, and 117 each contain a subset of rows of table 102. Collectively, tables 113, 115, and 117 can be referred to as a "sharded table." The data collectively stored in tables 113, 115, and 117 is equivalent to the data stored in table 102. Sharded database 110 is logically treated as a single database, and thus can be accessible by client applications just like unsharded database 100.

In one embodiment, sharding is a shared-nothing database architecture, since shards 112, 114, and 116 do not need to share physical resources such as processors, memory, and/or disk storage devices. Shards 112, 114, and 116 are loosely coupled in terms of software and do not need to run clusterware. From the perspective of a database administrator, sharded database 110 consists of multiple database instances that can be managed either collectively or individually. However, from the perspective of a client application, sharded database 110 looks logically like a single database. Therefore, the number of shards included in sharded database 110 and the distribution of data across those shards is completely transparent to client applications.

The configuration of a sharded database 110 provides various benefits. For example, in an embodiment, sharded database 110 improves scalability by eliminating performance bottlenecks and making it possible to increase performance and capacity of the system by adding additional shards and distributing load across shards. Sharded database 110 can be implemented as a share-nothing architecture, therefore, each of the shards in the sharded database is its own database instance and the shards do not need to share hardware, such as processor, memory, and/or disk storage.

In an embodiment, sharded database 110 provides fault containment, as it eliminates single points of failure, such as a shared disk, shared storage area network, clusterware, shared hardware, etc. Instead, sharding provides strong fault isolation, as a failure of a single shard does not affect availability of other shards.

In an embodiment, sharded database 110 provides enhancements to global data distribution. Sharding makes it possible to store particular data physically close to its customers. Storing data physically close to customers may be necessary to satisfy regulatory requirements when data has to be located, by law, in a certain jurisdiction, by physically locating the shard for that particular data in that jurisdiction. Storing data physically close to customers may also provide performance benefits by improving latency between customer and the underlying data stored in the shards.

In an embodiment, sharded database 110 allows for rolling upgrades of a system. In a sharded data architecture, changes made to one shard do not affect the contents of other shards in a sharded database, thereby allowing database administrators to first attempt changes on a small subset of data stored in a single shard before rolling those changes out to the rest of the shards in the sharded database.

In an embodiment, sharded database 110 provides simplicity in cloud deployments. Given the size of a shard can be made arbitrarily small, it is easy for a database administrator to deploy a sharded database in a cloud that consists of a low-end commodity server with local storage.

In an embodiment, sharded database 110 is most effective in applications that are well-partitioned, primarily access data within a single shard, and do not have strict performance and consistency requirements for cross-shard operations. Thus, sharding is particularly well-suited for OLTP systems, such as e-commerce, mobile, social, and SaaS.

In an embodiment, sharded database 110 provides improvements to the automatic propagation of database schema changes across shards. Instead of requiring a database administrator to manually apply database schema changes to each individual shard, sharded database 110 can automatically propagate such schema changes to shards from a single entry point.

In an embodiment, sharded database 110 supports traditional structured query language (SQL), and therefore can take advantage of all the full SQL syntax and keywords that are already available. Furthermore, given that sharded database 110 supports SQL, it can be easily integrated with existing client applications that are configured to access a relational database via SQL.

In an embodiment, sharded database 110 provides the full-featured benefits of a relational database, including schema control, atomicity, consistency, isolation, and durability.

In some embodiments, sharded database 110 provides direct routing of queries to shards, without requiring an intermediate component to route the query. This direct routing improves system latency by reducing the number of network hops necessary for processing the query.

General Architecture

Figure 2:
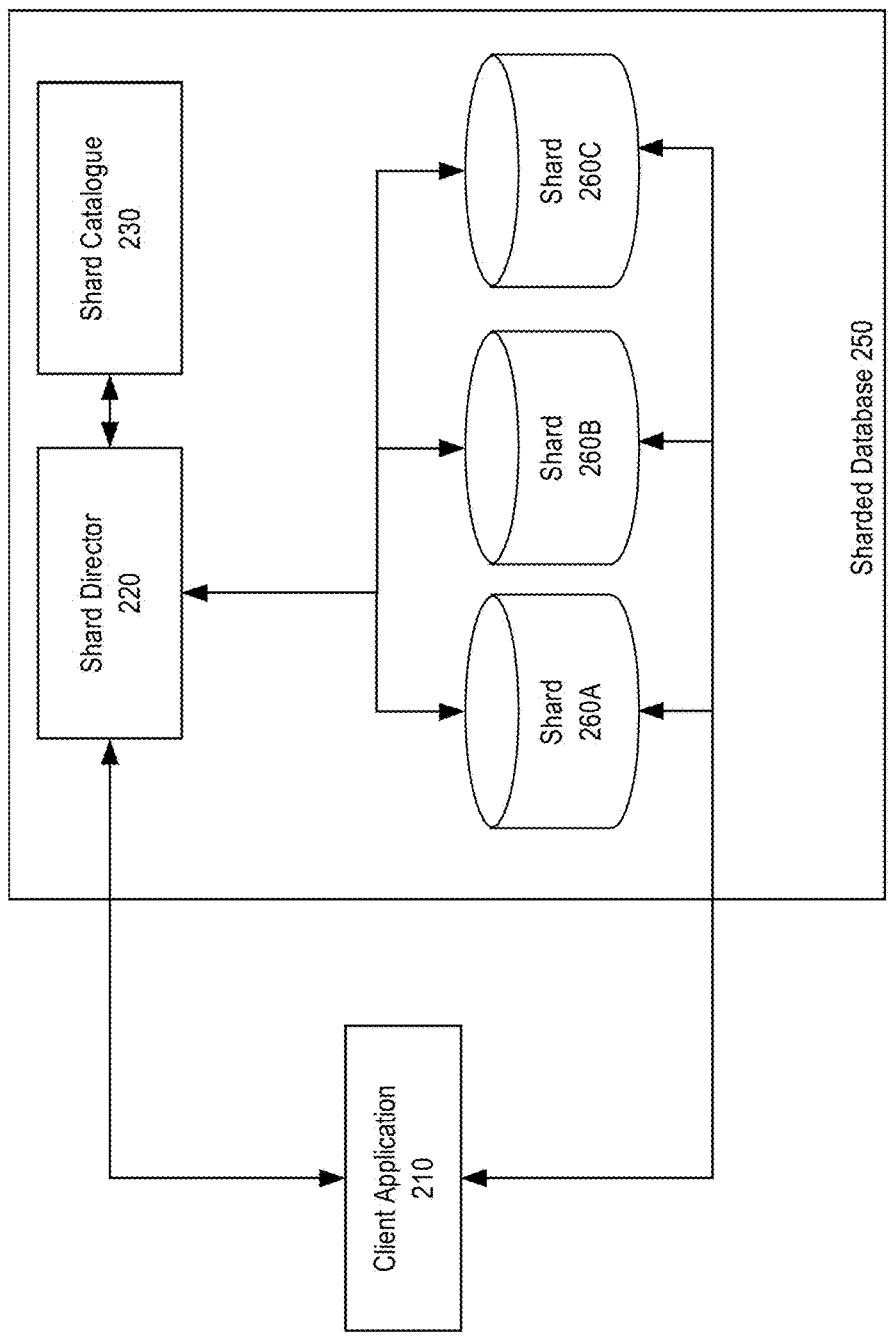
FIG. 2 is a block diagram of a system for sharded database, according to one embodiment.

FIG. 2 is a block diagram of a database system according to one embodiment. Client application 210 is any sort of client application that requires access to data stored in a database. In one embodiment, client application 210 may be a client in an OLTP setting, such as e-commerce, mobile, social, or SaaS. Client application 210 is communicatively coupled to sharded database 250.

Sharded database 250 is a logical database where data is horizontally partitioned across independent database instances. Specifically, data stored in sharded database 250 is horizontally partitioned and stored in shards 260A, 260B, and 260C. A sharded database may include any number of shards, and the number of shards in a sharded database may vary over time. According to one embodiment, each of shards 260A, 260B, and 260C is its own database instance that does need to share physical resources, such as processors, memory, and/or storage device, with other shards in the sharded database 250.

Shard Catalogue

Sharded database 250 includes a shard catalogue 230. Shard catalogue 230 is a special database that is used to store configuration data for the shard database 250. In one embodiment, the shard catalogue can be replicated to provide improved availability and scalability. Configuration data that is stored in the shard catalogue 230 may include: a routing table that maps which shard stores a chunk of data that corresponds to a given value, range of values, or set of values of a sharding key; shard topology data that describes the overall configuration of the shard database 250, information about the configuration of the shards 260A, 260B, and 260C; information about the configuration of the shard director 220, information about the client application 210, information about the schema of the data that is horizontally partitioned across shards 260A, 260B, and 260C, historical logs of pending and completed schema modification instructions for the shards 260A, 260B, and 260C, and all other information related to the configuration of the sharded database 250.

In one embodiment, a shard catalogue maintains a routing table that stores mapping data that includes a plurality of map entries. Each map entry in the plurality of map entries maps a distinct key value set of one or more sharding keys to a shard of a plurality of shards in a sharded database. In another embodiment, each map entry in the plurality of map entries maps a distinct key value set of one or more sharding keys to a chunk of data on a shard of the plurality of shards in a sharded database. In another embodiment, each map entry in the plurality of map entries maps a distinct key value set of one or more sharding keys to a shardspace that includes one or more shards in a sharded database. In one embodiment, a key value set can be a range of partition key values. In another embodiment, a key value set can be a list of partition key values. In another embodiment, a key value set can be set of hash values.

Thus, the routing table can be used to lookup, for a query that requires access to data for particular sharding key value, which shard in the sharded database contains the chunk of data necessary to process the query.

Shard Director

Sharded database 260 includes a shard director 220. Shard director 220 coordinates various functionalities across the sharded database 250, including, but not limited to: routing database requests to shards, propagating database schema changes to shards, monitoring the status of shards, receiving status updates from shards, receiving notifications from client applications, sending notifications to shards, sending notifications to client applications, and/or coordinating various operations that affect the configuration of the sharded database 260, such as resharding operations. Shard director 220 is communicatively coupled to shard catalogue 230, client application 210, and shards 260A, 260B, and 260C.

Although depicted as a single shard director 220, in one embodiment, sharded database 260 may include multiple shard directors 220. For example, in one embodiment, sharded database 260 may include three shard directors 220. Having multiple shard directors 220 may allow for load balancing of the coordination tasks performed by the shard directors 220, thereby improving performance. In the case of multiple shard directors 220, in one embodiment, one of the shard directors 220 may be selected as the manager of the shard directors 220 that is responsible for managing the remaining shard directors 220, including load balancing.

Table Family

In order to obtain the benefits of sharding, the schema of a sharded database should be designed in a way that maximizes the number of data requests that may be executed on a single shard rather than requiring multiple shards. By executing a query on a single shard, a cross-shard join is not required, thereby improving efficiency.

Often, there is a parent-child relationship between database tables. For example, a referential constraint may exist between a parent table and a child table. Specifically, in the case of a foreign key constraint, a column of a child table may be constrained to only store values that exist in the primary key of the parent table. Multiple tables linked by such relationships typically form a tree-like hierarchy where every child has a single parent. A "table family" is a representation of a hierarchy of related tables. A table in a table family that has no parent is called the "root table." There is only one root table in a table family.

For example, FIG. 3A illustrates an example of a table family 310. Table family 310 includes tables 312, 314, and 316. Tables 312, 314, and 316 illustrate a classic Customers/Order/LineItems schema. Table 312 is a table that includes customer information. The primary key of the Customers table 312 is the "CustNo" field. The Customers table 312 is the root table of the table family 310.

Orders table 314 is a table that includes order information. The primary key of the Orders table 314 is the "OrderNo" field. The foreign key of the Order table 314 is the "CustNo" field that refers to the primary key of the Customers table 312, indicating that the "CustNo" field of Orders table 314 is only allowed to store values that exist in the "CustNo" field of Customers table 312. Thus, the Orders table 314 is a child of the Customers table 312.

Line Items table 316 is a table that includes line item information. The primary key of the Line Items table 316 is the "LineNo" field. The foreign key of the LineNo table 316 is the "OrderNo" field that refers to the primary key of the Orders table 314, indicating that the "OrderNo" field of table 316 is only allowed to store values that exist in the "OrderNo" field of Orders table 314. Thus, the Line Items table 316 is a child of the Orders table 314.

According to one embodiment, when sharding tables that belong to a table family, all of the tables of a table family are partitioned by inheriting the partition key from the root table of the table family. Thus, the partition key of the root table is used as the sharding key for all tables in the table family. In one embodiment, a partition key is equivalent to a sharding key in a sharded database. In the example of table family 310, the "CustNo" field may be used as the partition key and the sharding key for all tables in the table family 310. Corresponding partitions from all tables of a table family are always stored in the same shard. Since, in a sharded database, join operations are usually performed on related data from tables in a table family, storing corresponding partitions from a table family in the same shard can improve the execution of such joins, as the join operations can be performed on a single shard and do not require a cross-shard query.

To illustrate, FIG. 3B shows an example of how the data from table family 310 may be sharded to three shards 320, 330, and 340. Shard 320 includes tables 322, 324, and 326 that have been partitioned based on the "CustNo" sharding key. Specifically, tables 322, 324, and 326 each contain corresponding data for the Customers, Orders, and Line Items tables where CustNo=123. Shard 330 includes tables 332, 334, and 336. Shard 340 includes tables 342, 344, and 346 that have been partitioned based on the "CustNo" sharding key as well. Specifically, tables 332, 334, and 336 each contain corresponding data from the Customers, Orders, and LineItems tables where CustNo=456. Specifically, tables 342, 344, and 346 each contain corresponding data from the Customers, Orders, and Line Items tables where CustNo=999.

Collectively, tables 322, 332, and 342 are a sharded table representation of the Customers table 312, however, now the contents are spread across three shards. Likewise, tables 324, 334, and 344 collectively contain the same data as Orders table 314, however, now the contents are spread across three shards. Additionally, tables 326, 336, and 346 collectively contain the same data as Line Items table 316, however, now the contents are spread across three shards. By sharding the contents of a table family 310 using the same sharding key for all tables 312, 314, and 316, each shard will be able to individually perform joins on the related data for the given table family, thereby improving system performance and reducing the frequency of cross-shard queries.

TABLE 1 presents exemplary code for creating sharded tables for the Customers, Orders, and LineItems tables:

TABLE 1

```
CREATE SHARDED TABLE Customers
( CustNo NUMBER NOT NULL
, Name VARCHAR2 (50)
, Address VARCHAR2 (250)
, CONSTRAINT RootPK PRIMARY KEY (CustNo)
)
PARTITION BY CONSISTENT HASH (CustNo)
PARTITIONS AUTO
TABLESPACE SET ts1
;
CREATE SHARDED TABLE Orders
( OrderNo NUMBER NOT NULL
, CustNo NUMBER NOT NULL
, OrderDate DATE
, CONSTRAINT OrderPK PRIMARY KEY (OrderNo)
, CONSTRAINT CustFK FOREIGN KEY (CustNo) REFERENCES
Customers (CustNo)
)
PARTITION BY REFERENCE (CustFK)
;
CREATE SHARDED TABLE LineItems
( CustNo NUMBER NOT NULL
, LineNo NUMBER(2) NOT NULL
, OrderNo NUMBER(5) NOT NULL
, StockNo NUMBER(4)
, Quantity NUMBER(2)
, CONSTRAINT LinePK PRIMARY KEY (CustNo, OrderNo, LineNo)
, CONSTRAINT LineFK FOREIGN KEY (CustNo, OrderNo) REFER-
ENCES
Orders (CustNo, OrderNo)
)
PARTITION BY REFERENCE (LineFK)
;
```

In the above syntax example, the Customers table is partitioned across shards by using the CustNo field as the partition key. The Customers table is the root table in the table family. The Orders and LineItems tables are a child and grand-child table, respectively, of the Customers table. The Orders and LineItems tables are partitioned by reference to foreign keys that indirectly point back to the partition key of the Customers table. Thus, the Orders and LineItems table are also partitioned based on the same partition key of the Customers table. Thus, the Customers, Orders, and LineItems tables are a table family that are being partitioned similarly across shards, with reference to the same partition key.

In another embodiment, a collection of tables is partitioned across shards as if it were a table family, even though the schema for the tables does not explicitly articulate a constraint that defines a parent-child relationship between the tables of the collection, such as a foreign key. In this case, a database administrator may recognize that the tables are related to one another, even though they are not explicitly a "table family". The database administrator can identify one or more partition keys to be used to partition the collection of tables across shards, such that the partitions of the collection of table include related data that would be likely used to satisfy a single query and such partitions from across the collection of tables will be included on the same shard. Thus, the database administrator can essentially simulate a logical grouping of a collection of tables even when an explicit table family is not formed based on a constraint in the schema. For example, in one embodiment, a collection of tables includes a Customers table and an Orders table. The Customers table and Orders table can each include a "CustNo" column, however, there is no referential constraint that links the Customers table to the Orders table in the schema. In this example, the database administrator can partition the collection of tables using the CustNo field as at least one partition key, even though there is no formal table family formed. Therefore, a logical grouping of a collection of tables can be used to create chunks of data, as will be described later.

Duplicated Tables

Some reference tables are relatively small, do not change often, and/or are often accessed together in conjunction with sharded tables. An example of a reference table may be a table of zip codes for the United States. Such zip code information is relatively small and static, yet may frequently be accessed in conjunction with other sharded tables that refer to an address. A reference table is a good candidate for implementation as a "duplicated table" that is copied across all shards in the sharded database. By storing a copy of a duplicated table on multiple shards, the system can ensure that more queries are able to be processed via a single shard instead of requiring a cross-shard query, thereby improving system efficiency.

FIG. 4A illustrates an example of an unsharded database 410. Unsharded database 410 includes Customers table 412, Orders table 414, and Line Items table 416, which, again, form a table family. Unsharded database 410 further includes Products table 418, which is an example of a reference table.

FIG. 4B illustrates an example of a sharded database that includes shards 420, 430, and 440. The sharding of tables 412, 414, and 416 is similar as to what was done in FIG. 3B. Specifically, shard 420 includes tables 422, 424, and 426. Shard 430 includes tables 432, 434, and 436. Shard 440 includes tables 442, 444, and 446. However, in addition, each of the shards 420, 430, and 440 respectively include duplicated table 418. In this way, each of the shards 420, 430, 440 has access to the contents of the table 418, thereby minimizing the need to perform a cross-shard query to access the contents of the reference table.

TABLE 2 presents exemplary code for creating a duplicated table:

TABLE 2

```
CREATE DUPLICATED TABLE Products (
SKU NUMBER PRIMARY KEY,
Product VARCHAR2 (20),
)
;
```

In one embodiment, the duplicated tables on each shard are synchronized using materialized view replication. In one embodiment, the duplicated table on each shard is a read-only materialized view. The master table for the materialized views is located in the shard catalogue. In one embodiment, the materialized views on all shards are automatically refreshed with a configurable frequency. In one embodiment, the CREATE DUPLICATED TABLE command automatically creates the master table, materialized views, and other objects required for materialized view replication.

Sharding as Distributed Partitioning

Even though a sharded database looks like a single database to client applications and client application developers, from the perspective of a database administrator, it is a set of shards, where each shard is a discrete database instance. A sharded table is partitioned across all shards of the sharded database. Thus, table partitions on each shard of a sharded database are no different than the regular partitions used in a non-sharded database.

FIG. 5 illustrates an example of a sharding as distributed partitioning. Unsharded database 500 includes a single table that is broken up into partitions 1-20. Sharded database 520 has those same partitions 1-20 distributed as partitions across shards 521, 522, 523, 524, and 525. From the perspective of a client application, the structure and format of the partitions is identical, however, in the case of sharded database 520, the partitions are distributed across five different shards, therefore, the computing load is distributed across the computing resources of each shard.

Tablespaces and Chunks

A "tablespace" is a collection of storage containers (e.g. data files) used to store data for database objects in a database. Database objects are objects managed by a database system. Examples of database objects include tables, indexes, and code modules which may be executed by database system. A database object may be referred to as being in a particular tablespace when the tablespace holds data for the database object. Each partition of a sharded table is stored in separate tablespace. Thus, a tablespace is a physical unit of data distribution in a sharded database. A "tablespace set" is a set of tablespaces.

It is possible to create different tables from a table family or a set of tables in different tablespace sets. For example, a Customers table can be created in the tablespace set TS1 and an Order table can be created in a tablespace set TS2. However, in order to minimize the number of cross-shard queries that are required, it must be guaranteed that the tablespace that stores partition_1 of the Customers table always resides in the same shard as the tablespace that stores the corresponding partion_1 of the Orders table. In order to achieve this goal, a "chunk" may be defined as set of data that stores corresponding partitions of tables. For example, in one embodiment, a chunk may be defined as a set of tablespaces that store corresponding partitions of all tables in a table family. A chunk contains a single partition from each table of a table family or a set of related tables.

Figure 6:
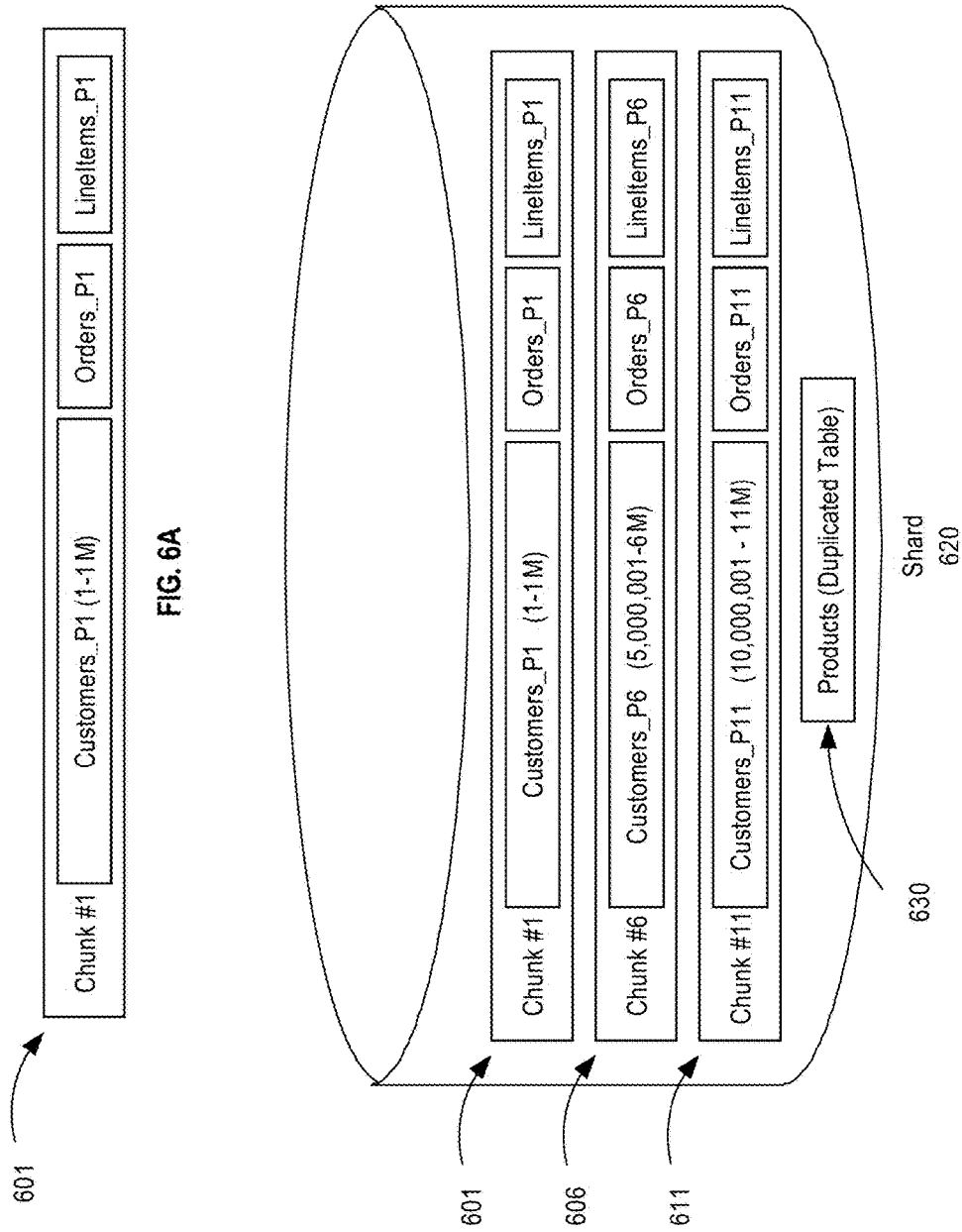
FIGS. 6A and 6B illustrate examples of chunk configuration in a sharded database, according to one embodiment.

FIG. 6A illustrates an example of a chunk 601, according to one embodiment. Chunk 601 stores corresponding partitions of the Customers, Orders, and LineItems tables. Specifically, chunk 601 stores partition Customers_P1 that covers customers 1 through 1 million (1M) in the Customers table, based on a range of values of a partition key. Chunk 601 further stores partition Orders_P1 that includes the corresponding rows in the Order table for the customers in Customers_P1, using the same partition key. Chunk 601 further stores partition LineItems_P1 that includes the corresponding rows in the LineItems table for the orders in Orders_P1 for the same partition key. Thus, the partitions Customers_P1, Orders_P1, and LineItems_P1 are all partitioned based on the same partition key. Therefore, a join operation that requires data from the Customers, Orders, and LineItems table for a customer that falls within the set of values of the partition key can be serviced by a single shard that contains the chunk 601, without requiring a cross-shard query.

FIG. 6B illustrates an example of a shard 620. Shard 620 includes chunks 601, 606, and 611 that include the partitions from the table family that includes the Customers, Order, and LineItems tables. Each of the chunks 601, 606, and 611 contains a single partition from each table of the table family, based on distinct ranges of values of the partition key. In this example, the partition key is the CustNo column of the Customers table. For example, chunk 601 includes data from the Customers, Orders, and LineItems tables for CustNo in the range of 1 to 1 million. Chunk 606 covers data from the Customers, Orders, and LineItems tables for CustNo in the range of 5,000,001 to 6 million. Chunk 611 includes data from the Customers, Orders, and LineItems tables for CustNo in the range of 10,000,001 to 11 million. Shard 620 further includes table 630, which is a duplicated copy of the Products table, which is a reference table. Thus, a query that requires data from corresponding rows of Customers, Orders, or LineItems that share the same partition key value can be serviced by a single shard that contains the chunk for the partitions of the those three tables. Such queries do not require cross-shard joins.

System-Managed Sharding

In one embodiment, system-managed sharding is a technique for sharding in which the system automatically determines the mapping of data to shards in a sharded database. Data is automatically distributed across shards using partitioning by a hash strategy, as will be described herein. Thus, system-managed sharding evenly and randomly distributes data across shards. Because data is randomly and evenly distributed across shards, system-managed sharding reduces the likelihood of creating chunks that are hot spots that need to service a disproportionate amount of data requests relative to other chunks in the sharded database. Additionally, because data is randomly and evenly distributed across shards, system-managed sharding provides uniform performance across shards. In one embodiment, a sharded database using system-managed sharding can maintain a balanced distribution of data when shards are added or removed from the sharded database.

In one embodiment, in system-managed sharding, data is allocated to shards based on a hash function that is applied to a sharding key. For example, in one embodiment, traditional hash is a partitioning strategy that may be used in system-managed sharding. In traditional hash, as hash function is applied to a sharding key as follows to determine the chunk to assign the data to: hash(key) % N. Here, hash( ) is the hash function, and N is a constant that represents the number of chunks. Thus, by applying the traditional hash to the sharding key, the system can determine which chunk to assign the data associated with the sharding key.

In one embodiment, consistent hash is a partitioning strategy that may be used in system-managed sharding. In consistent hash, a hash function is applied to a sharding key to obtain a hash value. The possible range of values of the hash function (e.g. from 0 to $2^{32}$) is divided into a set of N adjacent intervals that each represent a different chunk.

Thus, by applying the consistent hash to the sharding key, the system can determine which chunk to assign the data associated with the sharding key.

Figure 7:
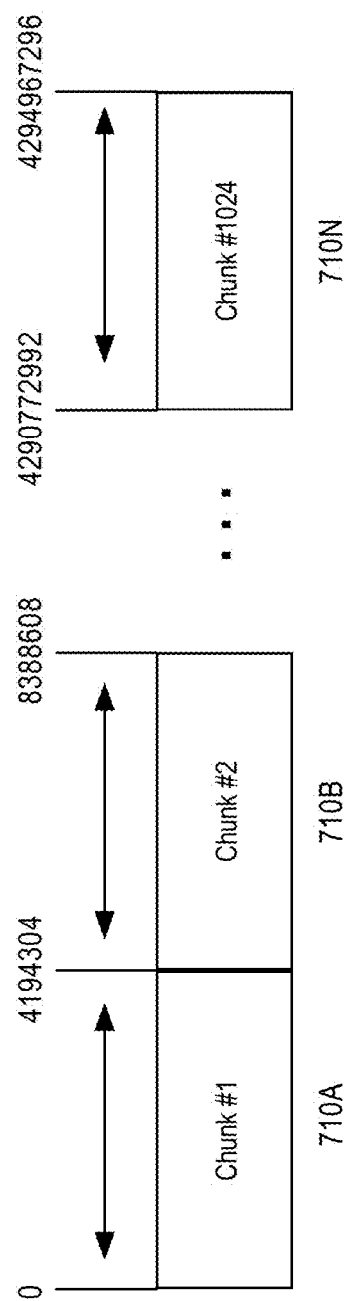
FIG. 7 illustrates an example of using consistent hash to assign a range of values to chunks, according to one embodiment.

For example, FIG. 7 illustrates an example of a range of values assigned to chunks. In this example, the sharded database contains 1024 chunks, and each chunk gets assigned a range of $2^{22}$ hash values. Thus, chunk 710A is assigned the range of hash values from 0 to 4194304 (e.g., $2^{22}$), chunk 710B is assigned to the range from 419304 (e.g., $2^{22}$) to 8388608 (e.g., $2*2^{22}$), and so forth until chunk 710N is assigned to the range from 4290772992 (e.g., $1023*2^{22}$) to 4294967296 (e.g., $1024*2^{22}$).) Therefore, partitioning by consistent hash is essentially partitioning by the range of hash values.

Assuming that all shards have the same computing power, an equal number of chunks are assigned to each shard in the sharded database. For example, if 1024 chunks are created in a sharded database that contains 16 shards, each shard will contain 64 chunks. In one embodiment, chunks are randomly allocated to shards to provide a random and even distribution of data across shards.

In the event of resharding, when shards are added to or removed from a sharded database, a certain number of chunks are moved between shards to maintain even distribution of chunks across shards. The content of chunks does not change during this resharding process, therefore, no rehashing is necessary.

The number of chunks in a sharded database with system-managed sharding can be specified in the CREATE SHARDCATALOG command. Once a sharded database is deployed, the number of chunks can only be changed by splitting chunks. When a chunk is split, its range of hash values is divided into two ranges, but nothing needs to be done for the rest of the chunks. Any chunk can be independently split at any time.

A chunk can contain only one tablespace from a given tablespace set. However, the same tablespace set can be used for multiple tables that belong to the same table family. In this case, each tablespace in the tablespace set will store multiple partitions, one from each table. Alternatively, each table in a table family can be stored in a separate tablespace set. In this case, a chunk contains multiple tablespaces: one of each table, with each tablespace storing a single partition.

Figure 8:
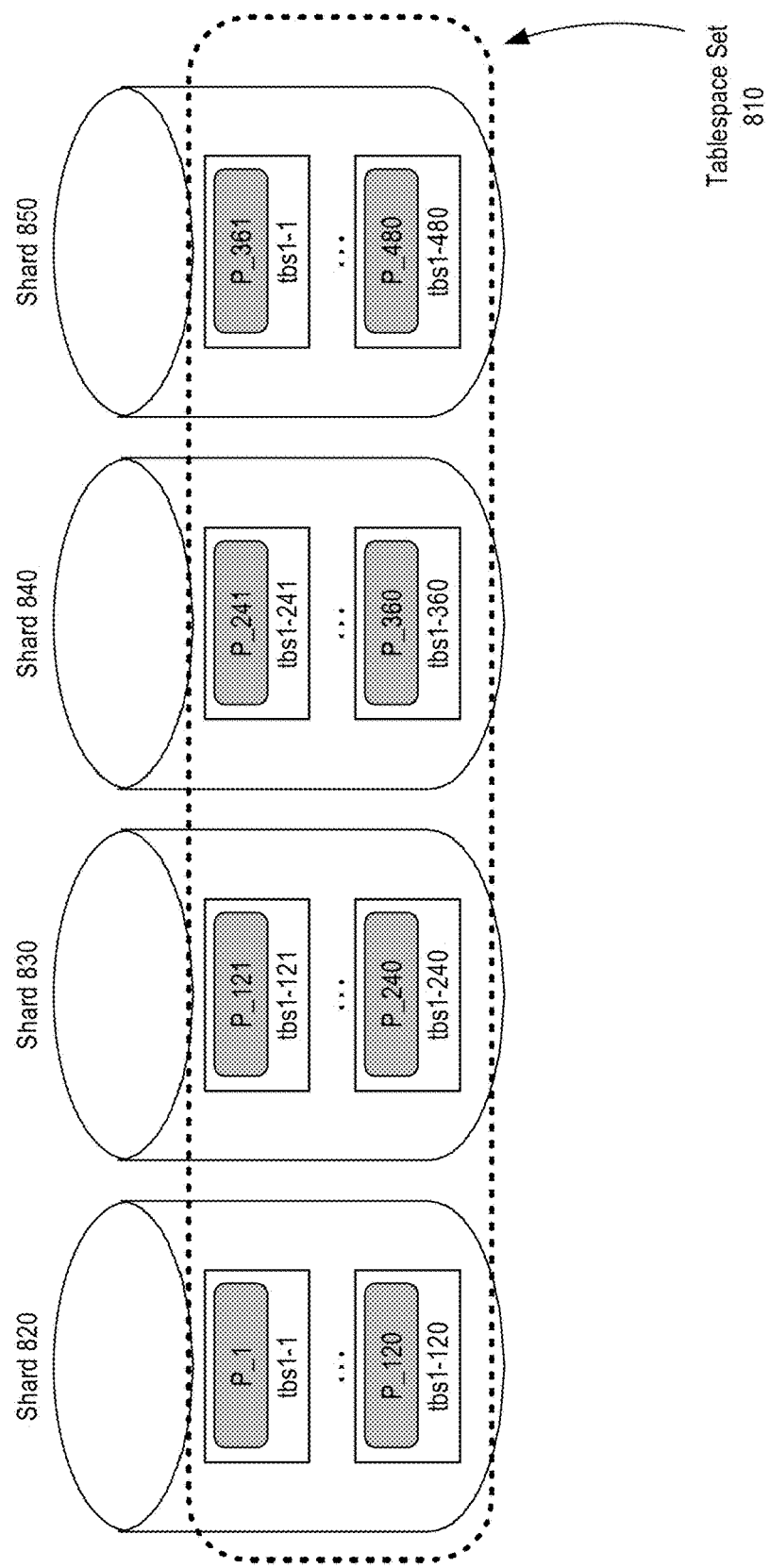
FIG. 8 illustrates an example of system-managed sharding, according to one embodiment.

FIG. 8 illustrates an example of system-managed sharding that shows the relationship between partitions, tablespaces and shards for a simple case with a single sharded table. In this case, each chunk contains a single tablespace and each tablespace stores a single partition. The sharded database includes shards 820, 830, 840, and 850. Partitions P_1 through P_480 are located in tablespaces tbs1-1 through tbs1-480. Tablespace set 810 includes tablespaces tbs1-1 through tbs1-480.

TABLE 3 presents exemplary code for creating a sharded table using system-managed sharding:

TABLE 3

CREATE SHARDED TABLE customers
( cust_id NUMBER NOT NULL
, name VARCHAR2 (50)
, address VARCHAR2 (250)
, location_id VARCHAR2 (20)
, class VARCHAR2 (3)
, signup DATE
,
CONSTRAINT cust_pk PRIMARY KEY(cust_id)
)

TABLE 3-continued

PARTITION BY CONSISTENT HASH (cust_id)
PARTITIONS AUTO
TABLESPACE SET ts1
;

In this example, a sharded table "customers" is created what uses consistent hash across a cust_id sharding key. The statement includes "PARTITIONS AUTO" which indicates that the number of partitions will be automatically set to the number of tablespaces in the tablespace set ts1. Thus, the number of chunks will also be equal to the number of tablespaces in the tablespace set ts1.

User-Defined Sharding

In one embodiment, user-defined sharding is a technique for sharding that allows a user, such as a database administrator, to explicitly specify a user-defined mapping of data to shards. User-defined sharding may be used when certain data needs to be stored on a particular shard and the database administrator needs to have full control over moving data between shards. For example, user-defined sharding may be beneficial when performance constraints require that certain data be located on a particular shard. In another example, user-defined sharding may be necessary when regulatory requirements require that particular data be stored on a particular shard. Another benefit of user-defined sharding is that, in the case of planned or unplanned outage of a shard, the database administrator knows exactly what data is unavailable due to the outage. A disadvantage of user-defined sharding is that the database administrator needs to monitor the shards and manually maintain a balanced distribution of data and workload across shards.

With user-defined sharding, a sharded table can be partitioned by range or list. The CREATE TABLE syntax for a sharded table is similar to the syntax for creating a regular table, except for an additional requirement that each partition should be stored in a separate tablespace. TABLE 4 presents exemplary code for creating a table using user-defined sharding for an accounts table:

TABLE 4

CREATE SHARDED TABLE accounts
( id NUMBER
, account_number NUMBER
, customer_id NUMBER
, branch_id NUMBER
, state VARCHAR (2)
, status VARCHAR2 (1)
)
PARTITION BY LIST (state)
( PARTITION p_northwest VALUES ('OR', 'WA') TABLESPACE tbs1
, PARTITION p_southwest VALUES ('AZ', 'UT', 'NM') TABLESPACE tbs2
, PARTITION p_northcentral VALUES ('SD', 'WI') TABLESPACE tbs3
, PARTITION p_southcentral VALUES ('OK', 'TX') TABLESPACE tbs4
, PARTITION p_northeast VALUES ('NY', 'VR', 'NJ') TABLESPACE tbs5
, PARTITION p_southeast VALUES ('FL', 'GA') TABLESPACE tbs6
)
;

In the example shown in TABLE 4, an accounts table is created as a sharded table, and is partitioned by a list, using the state as the partition key. The user is defining which partitions, based on a partition key, are assigned to a particular tablespace. There is no tablespace set for user-defined sharding. Each tablespace has to be created explicitly. A "shardspace" is a set of shards that store data that corresponds to a range or list of key values. Specifically, in the case of user-defined sharding, a shardspace consists of a shard or a set of fully replicated shards. TABLE 5 presents exemplary code for creating tablespaces for the accounts table:

TABLE 5

CREATE TABLESPACE tbs1 IN SHARDSPACE west;
CREATE TABLESPACE tbs2 IN SHARDSPACE west;
CREATE TABLESPACE tbs3 IN SHARDSPACE central;
CREATE TABLESPACE tbs4 IN SHARDSPACE central;
CREATE TABLESPACE tbs5 IN SHARDSPACE east;
CREATE TABLESPACE tbs6 IN SHARDSPACE east;

Thus, in the example shown above in TABLE 5, the user is manually defining the location of each tablespace in a shardspace. TABLE 6 presents exemplary code for creating shardspaces and populating shards for the accounts table:

TABLE 6

ADD SHARDSPACE -SHARDSPACE west, central, east;
ADD SHARD -CONNECT shard-1 -SHARDSPACE west;
ADD SHARD -CONNECT shard-2 -SHARDSPACE central;
ADD SHARD -CONNECT shard-3 -SHARDSPACE east;

Thus, in the example shown above in TABLE 6, the user is manually defining what shardspaces are populating each shard.

Figure 9:
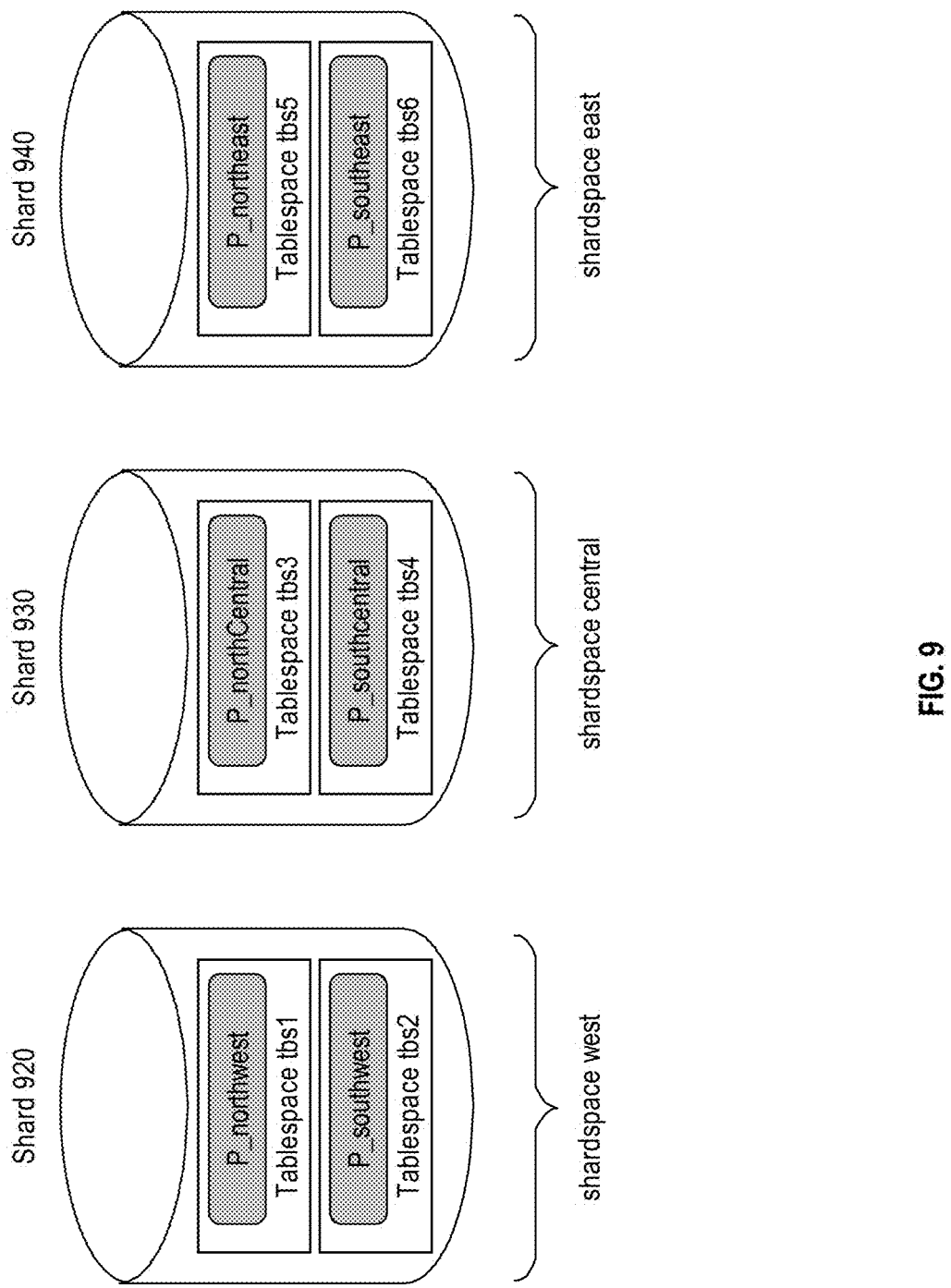
FIG. 9 illustrates an example of mapping of partitions to tablespaces and shards, according to one embodiment.

FIG. 9 illustrates an example of the mapping of partitions to tablespaces and tablespaces to shards for the accounts table. The accounts table is sharded across shards 920, 930, and 940. Shard 920 is associated with the west shardspace, shard 930 is associated with the central shardspace, and shard 940 is associated with the east shardspace.

In one embodiment, user-defined sharding can be used to segregate data onto specific shards based on performance or other constraints. For example, in one embodiment, using user-defined sharding, a first set of data may be allocated to a first set of shards that are accessible to a cloud environment, and a second set of data may be allocated to a second set of shards that are inaccessible to a cloud environment. Segregating data may be helpful due to privacy or regulatory concerns that require data to be inaccessible via a cloud environment. In other embodiments, segregating data may be helpful for archival purposes, as data that is archived is segregated onto shards that have lower performance capabilities, and data that is actively being used is segregated onto shards that have higher performance capabilities.

Composite Sharding

In one embodiment, composite sharding is an algorithm for sharding that combines features of user-defined sharding with system-managed sharding.

System-managed sharding randomly distributes data across shards, which provides better load balancing compared to user-defined sharding that uses partitioning by range or list. However, system-managed sharding does not give the database administrator any control over the assignment of data to shards.

User-defined sharding provides the ability to allocate particular data to particular shards, which may be necessary to satisfy various requirements. For example, regulatory requirements may require certain data to be stored in computer hardware located in a particular geographic location. Likewise, shards may be implemented on different computing devices with varying hardware performance characteristics, including, but not limited to processors, memory, and storage. Additionally, data may be differentiated based on classification of data determined based on a particular column in a table. For example, in the case of customer-related data, some customers may be classified as "GOLD" customers and others may be classified as "SILVER". In this example, data for GOLD customers may need to be stored in a set of shards, and data for SILVER customers may need to be stored in a different set of shards.

With composite sharding, data may be partitioned across more than one level of partitions. For example, data may be first partitioned by list or range across multiple shardspaces, and then further partitioned by consistent hash across multiple shards in each shardspace. The multiple levels of sharding provided by composite sharding allows the system to automatically maintain balanced distribution of data across shards in each shardspaces and, at the same time, partition data across shardspaces given user-defined mapping data. Composite sharding can be performed using data definition language (DDL).

For example, suppose a database administrator wants to allocate three shards hosted on faster servers to GOLD customers, and four shards hosted on slower machines to SILVER customers. Within each set of shards, customers have to be distributed using partitioning by consistent hash on customer_id. Thus, in this example, the data is partitioned across shardspaces by range or list, using a first sharding key that indicates a class of customer. The data is further partitioned across shards within a shardspace by consistent hash, using a second sharding key for the customer_id. In one embodiment, the first sharding key may be referred to as a supersharding key. A supersharding key is a type of sharding key that is used for a higher level partition in a composite sharding configuration. In one embodiment, the routing table stores mapping data that maps, for a combination of a set of values of the first sharding key and the set of values of the second sharding key to a location of a chunk that contains the data in a particular shard in a particular shardspace. Thus, the routing table may be used to determine, using a combination of a first sharding key and second sharding key, the location of a chunk on a particular shard in a particular shardspace that contains data for the given key combination.

Figure 10:
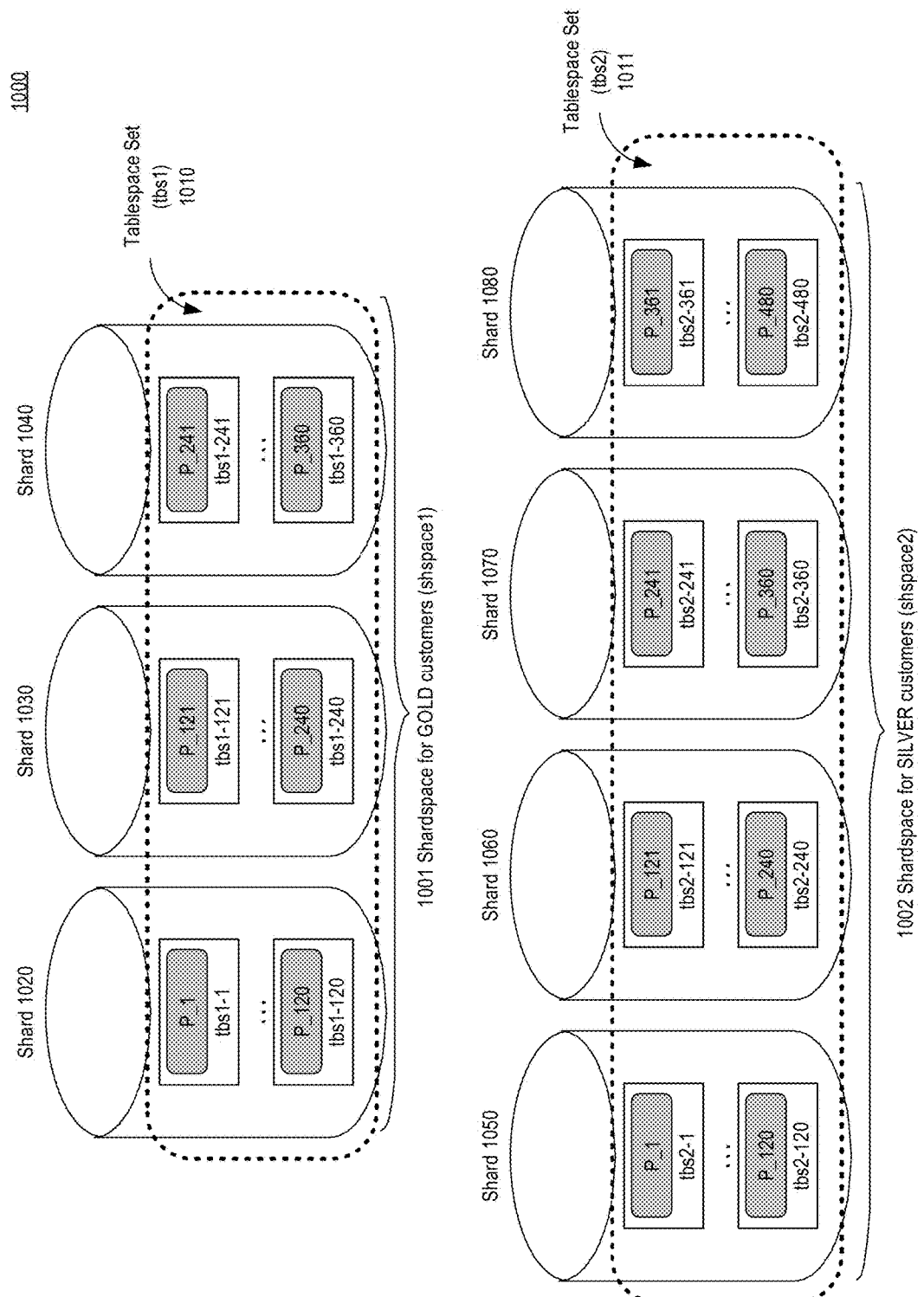
FIG. 10 illustrates an example of a sharded database using composite sharding, according to one embodiment.

FIG. 10 illustrates an example of a sharded database 1000 that includes shardspace 1001 and shardspace 1002. Shardspace 1001 is a shardspace that is dedicated to GOLD customers and includes shards 1020, 1030, and 1040 that covers tablespace set 1010. Shardspace 1002 is a shardspace that is dedicated to SILVER customers and includes shards 1050, 1060, 1070, and 1080 that covers tablespace set 1011.

TABLE 7 presents exemplary code for creating shardspaces 1001 and 1002:

TABLE 7

ADD SHARDSPACE -SHARDSPACE shspace1, shspace2;
ADD SHARD -CONNECT shard1 -SHARDSPACE shspace1;
ADD SHARD -CONNECT shard2 -SHARDSPACE shspace1;
ADD SHARD -CONNECT shard3 -SHARDSPACE shspace1;
ADD SHARD -CONNECT shard4 -SHARDSPACE shspace2;
ADD SHARD -CONNECT shard5 -SHARDSPACE shspace2;
ADD SHARD -CONNECT shard6 -SHARDSPACE shspace2;
ADD SHARD -CONNECT shard7 -SHARDSPACE shspace2;

In the above TABLE 7, the user provides a mapping of a number of shards (shard1, shard2, shard3, shard 4, shard5, shard6, and shard7) to a number of shardspaces (shspace1 and shspace2). TABLE 8 presents exemplary code for creating tablespace sets 1010 and 1011:

TABLE 8

```
CREATE TABLESPACE SET tbs1 IN SHARDSPACE shspace1;
CREATE TABLESPACE SET tbs2 IN SHARDSPACE shspace2;
```

In the above example of Table 8, the user providing a mapping of tablespace sets (tbs1 and tbs2) to shardspaces (shspace1 and shspace2). Once the shardspaces and the tablespace sets are created, a sharded table can be created that partitions the sharded table into two partition sets: GOLD and SILVER based on the class of service. TABLE 9 presents exemplary code for creating the sharded table for the sharded database 1000:

TABLE 9

```
CREATE SHARDED TABLE customers
( cust_id NUMBER NOT NULL
, name VARCHAR2 (50)
, address VARCHAR2 (250)
, location_id VARCHAR2 (20)
, class VARCHAR2 (3)
, signup_date DATE
, CONSTRAINT cust_pk PRIMARY KEY(cust_id) )
PARTITIONSET BY LIST (class)
PARTITION BY CONSISTENT HASH (cust_id)
PARTITIONS AUTO
(PARTITIONSET gold VALUES ('gld') TABLESPACE SET tbs1,
PARTITIONSET silver VALUES ('slv') TABLESPACE SET tbs2)
;
```

In the above example of TABLE 9, the customers table is created as a sharded table. The customers table is partitioned first by list using the "class" column as the partition key. In TABLE 9, a mapping provided by the user maps GOLD customers to tablespace set tbs1 and SILVER customers to tablespace set tbs2. This is an example of user-defined sharding. The customers table is further partitioned using the "cust_id" as the partition key. This further partitioning uses consistent hash and is an example of system-managed sharding. Thus, the final result of TABLE 9 is a composite shard that combines the features of user-defined sharding with system-managed sharding.

Composite-sharding provides the benefits of user-defined sharding, as it allows a user to customize the allocation of data to shardspaces based on user-defined constraints. Such user-defined constraints can be varied based on application, and may include constraints such as regulatory restrictions on the physical location of data, the differentiation based on class of data, or the allocating of data on different hardware resources. Composite-sharding likewise provides the benefits of system-managed sharding by providing for the automatic and randomized distribution of data within shards within the same shardspace. Thus, composite-sharding is a multilevel sharding approach that combines the benefits of user-defined sharding and system-managed sharding.

In one embodiment, multilevel composite sharding is a strategy for distributing data in a sharded database that can include any number of N levels of partitioning and is not limited to two levels of partitioning. For example, in one embodiment, the first N−1 levels are each partitioned based on range or list and may each be partitioned using a different partition key. Furthermore, in one embodiment, the Nth level is partitioned based on a hash function, such as a consistent hash function. Thus, this multilevel composite sharding can be used to simulate multilevel hierarchical organization of data across one or more shardspaces, tablespace sets, and/or shards. Such a multilevel composite sharding strategy provides the benefits of user-defined sharding and the benefits of system-managed sharding.

In one embodiment, when using composite sharding, there exists a sharding key for each level of sharding. The plurality of sharding key values can be stored in key value sets in order to maintain mapping data to allow for location of a particular piece of data that resides on a shard in a multilevel composite sharded database. In one embodiment, in order to determine which shard contains data for a particular database request, the client application will need to include, with the database request, the values for all sharding keys.

Sub-Partitioning

In one embodiment, sub-partitioning techniques may be combined with sharding techniques, to allow partitions included in a shard to be further sub-partitioned. Sub-partitioning splits each partition into smaller parts. Sub-partitioning provides various benefits. For example, sub-partitioning allows for multi-level organization of data across shards. For example, within a shard, data can be organized into subpartitions based on date, class of customer, or some other criteria from the data. Sub-partitioning is beneficial for efficient parallel execution within a shard, especially in the case of sharding by range or list when the number of partitions per shard may be small. Data that is sub-partitioned may be partitioned by list, range, or a hash function, such as consistent hash or traditional hash.

TABLE 10 presents exemplary code for system-defined sharding by consistent hash with subpartitioning by range:

TABLE 10

```
CREATE SHARDED TABLE customers
( cust_id NUMBER NOT NULL
, name VARCHAR2 (50)
, address VARCHAR2 (250)
, location_id VARCHAR2 (20)
, class VARCHAR2 (3)
, signup_date DATE
, CONSTRAINT cust_pk PRIMARY KEY(cust_id, signup_date)
)
TABLESPACE SET tbs1
PARTITION BY CONSISTENT HASH (cust _id)
SUBPARTITION BY RANGE (signup_date)
SUBPARTITION TEMPLATE
( SUBPARTITION per1 VALUES LESS THAN
(TO_DATE('01/01/2000','DD/MM/YYYY'))
, SUBPARTITION per2 VALUES LESS THAN
(TO_DATE('01/01/2010','DD/MM/YYYY'))
, SUBPARTITION per3 VALUES LESS THAN
(TO_DATE('01/01/2020','DD/MM/YYYY'))
, SUBPARTITION future VALUES LESS THAN (MAXVALUE))
)
PARTITIONS AUTO
;
```

Figure 11:
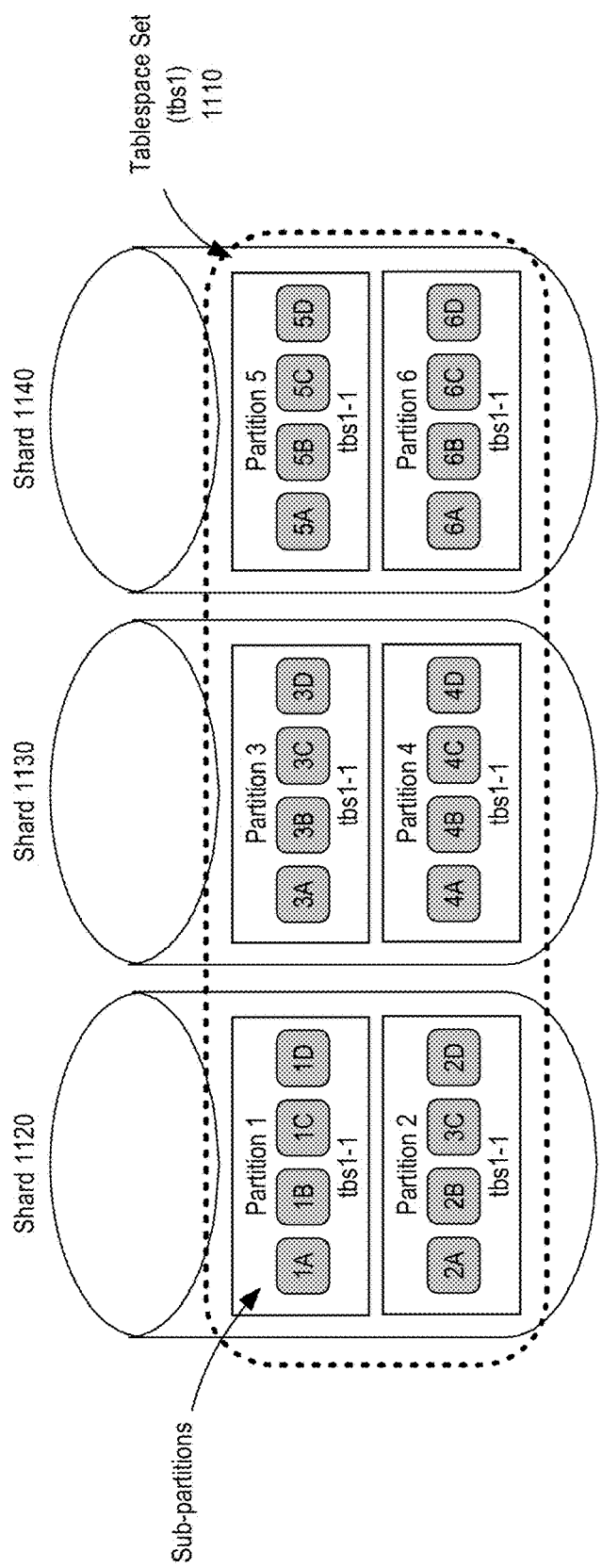
FIG. 11 is an example of a sub-partitioned sharded database, according to one embodiment.

In this example, a Customers sharded table is created. The Customers sharded table is partitioned first by consistent hash using the cust_id, and then sub-partitioned by a signup_date into four sub-partitions. FIG. 11 illustrates an example of the result of applying this code. The partitions are all created in tablespace set tbs1 1110. Partitions are partitioned by consistent hash across shards 1120, 1130, and 1140. Each of the partitions is in its own tablespace. Moreover, each of the partitions includes four sub-partitions, which are partitioned by signup_date and stored in the parent's tablespace.

Sub-partitioning can be combined with system-managed sharding, user-defined sharding, or composite sharding. If combining sub-partitioning with composite sharding, the data in a table is ultimately organized in three levels: partition sets, partitions, and subpartitions. The partition keys for each level of partitioning can be different, and the routing table can be updated to include mapping data for all three partition keys.

An example application area for sub-partitioning could be in storing data regarding a Customers table that complies with regulatory requirements and archiving requirements. Regulatory requirements may require that data about particular customers be stored in a shard physically located in the geographic jurisdiction of the customer. Archiving requirements may require that data for older customers be stored separately than data for newer customers. For example, data on older customers may need to be stored separately to be archived to backup storage. The present requirements can be satisfied using user-defined sharding to store create partitions for the sharded table such that each shard contains data for customers that are geographically located locally in the same jurisdiction as the shard, and sub-partitioning to create sub-partitions that group customers based on signup date for the service. Thus, sub-partitioning allows for multi-level organization of data in a sharded database.

Replication

Since each of the shards in a sharded database is its own database instance, the present system can use existing replication techniques for replicating data stored in shards. For example, in active/active replication, two peer database instances can store identical sets of data that can be changed and accessed by client applications. Changes made to one of the peer database instances is replicated to the other peer database instance, and vice versa. Under active/active replication, there is no master replica, and the peer database instances are maintained to be identical.

In master/slave replication, a master database instance and multiple slave database instances exist. The master replica is the source of truth, and can accept read and write transactions. Changes made to the master database instance are replicated to the slave database instances. The slave database instances are read-only.

Thus, in one embodiment, data stored in a chunk in a first shard may be replicated to one or more additional shards. Such replication of data in a chunk may be performed using either active/active replication or master/slave replication.

Resharding

Resharding is a process of redistributing data between shards in a sharded database. Resharding can be triggered by various conditions. Resharding involves moving a chunk or a portion of a chunk to a new shard. As described earlier, a chunk is a unit of data migration between shards. By storing related data from different sharded tables in the same chunk, and moving the chunk between shards as an atomic unit, the resharding process can ensure that related data from different sharded tables are moved together.

In one embodiment, a resharding process can be triggered when a new shard is added to the sharded database. In this scenario, the resharding process may be automatic, and will automatically redistribute one or more chunks in the sharded database to move chunks from old shards to the new shard.

In one embodiment, a resharding process can be triggered when a shard is removed from a sharded database. In this scenario, the resharding process may be automatic, and will automatically redistribute one or more chunks from the shard that is being removed from the sharded database to another shard in the sharded database that is not being removed.

In one embodiment, a resharding process can be triggered when a database administrator uses a command to manually break up or split up a particular chunk. This may occur when, for example, the database administrator recognizes that a particular chunk is oversized and needs to be split into smaller chunks and redistributed. The oversized chunk can be split into two or more smaller chunks, which are then redistributed to shards in the sharded database.

In one embodiment, a resharding process can be triggered when the sharded database detects a significant load on a particular shard. In order to balance the load across the sharded database, the sharded database can, in response to detecting the significant load on a particular shard, identify one or more chunks on the particular shard to be redistributed to other shards in the sharded database. In one embodiment, the identification of one or more chunks for redistribution is random.

In one embodiment, the ability to perform resharding provides a sharded database with elastic scalability by allowing the sharded database to reconfigure the distribution of data in response to triggering events, such as newly added or removed shards, manual intervention by a database administration, or the detection of a significant load on a particular shard.

FIGS. 12A, 12B, and 12C depict an example of resharding of a sharded database when a new shard is added to the database. In FIG. 12A, a sharded database includes Shards 1220, 1230, 1240, and 1250. Currently, shard 1220 includes chunks 1201, 1202, 1203, and 1204. Shard 1230 includes chunks 1205, 1206, 1207, and 1208. Shard 1240 includes chunks 1209, 1210, 1211, and 1212. Additionally, shard 1250 has just been added to the sharded database. However, as the shard is new, shard 1250 does not have any chunks yet.

In FIG. 12B, copies are made of chunks 1204, 1208, and 1212 from shards 1220, 1230, and 1240, respectively. The copies of chunks 1204, 1208, and 1212 are stored in shard 1250 and the original copies of these chunks are deleted from their original shards 1220, 1230, and 1240.

FIG. 12C shows an example of the final result of the resharding process. After resharding is complete the chunks in the sharded database have been redistributed as follows: shard 1220 includes chunks 1201, 1202, and 1203; shard 1230 includes chunks 1205, 1206, and 1207; shard 1240 includes chunks 1209, 1210, and 1211; and new shard 1250 includes chunks 1204, 1208, and 1212, which were redistributed from other shards in the sharded database. Thus, the sharded database has automatically redistributed the data in the sharded database in response to the addition of new shard 1250. This automatic redistribution of data in response to adding a new shard provides for loading balancing in the sharded database.

Figure 13:
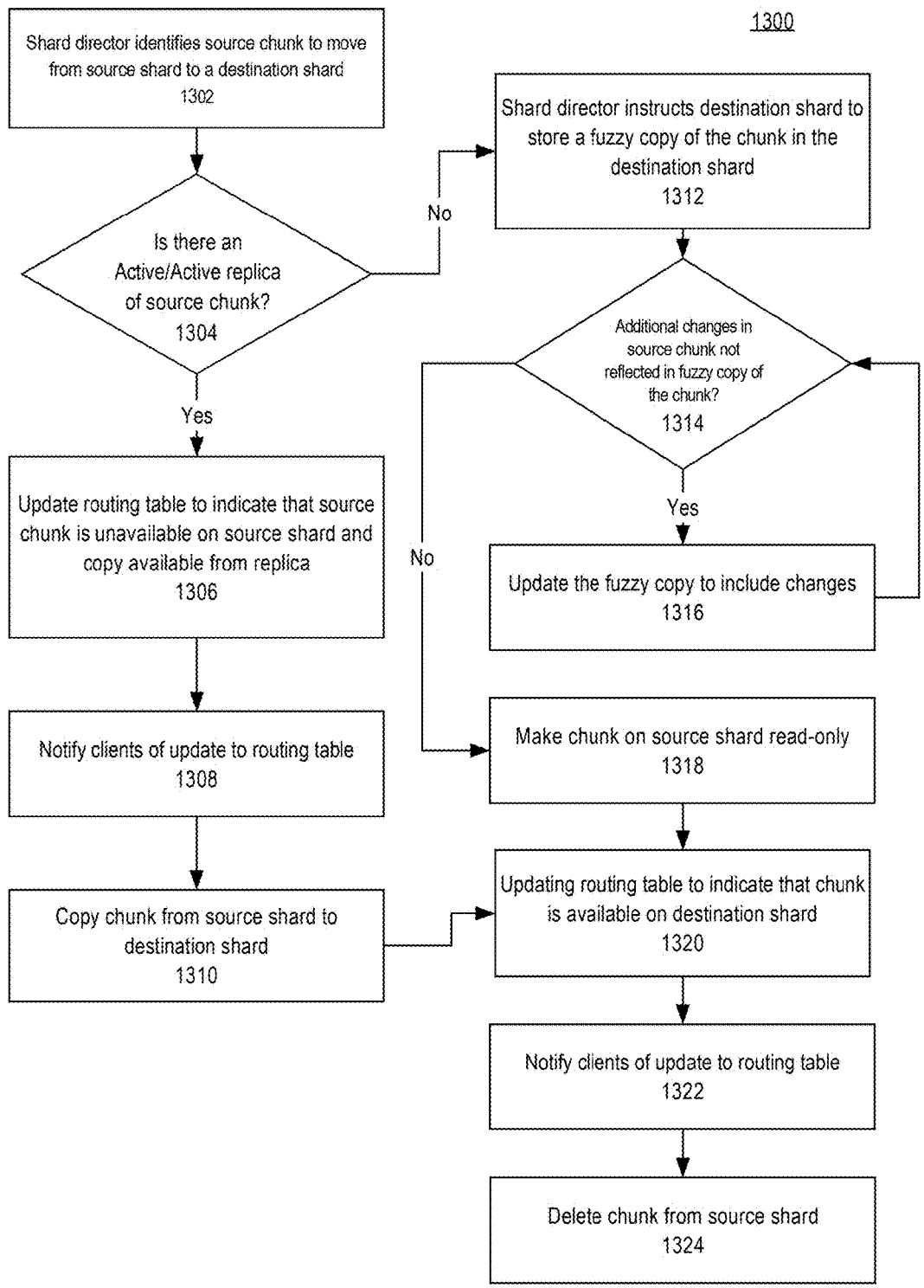
FIG. 13 is a flow diagram for a process of resharding, according to one embodiment.

FIG. 13 illustrates a flow diagram for a process 1300 for resharding, according to one embodiment. In step 1302, the shard director identifies a source chunk to move from a source shard to a destination shard. As described earlier, this can be done automatically in response to detecting a significant load on a source shard or automatically in response to detecting a new shard added to the sharded database. In this case the source chunk that will be moved may be identified based on a random selection from amongst all chunks located at the source shard. In another embodiment, the source chunk may be identified in response to a database command provided by a database administrator, such as a command to split a chunk or move a chunk. The process 1300 may then proceed to step 1304.

In step 1304, the shard director may optionally determine if the sharded database uses active/active replication or not. If the sharded database uses active/active replication, there will exist a duplicate copy of the source chunk in a replica that can be used for servicing database queries that require access to data in the source chunk while the resharding process continues. If the sharded database does not use active/active replication, there might not exist a duplicate copy of the source chunk in a replica that can be used for servicing database queries that require access to data in the source chunk while the resharding process continues. If the sharded database uses active/active replication, the process 1300 may proceed to step 1306. If the sharded database does not use active/active replication, the process 1300 may proceed to step 1312.

In step 1306, since the shard director knows that a copy of the source chunk is available from a replicated source, the shard director updates the routing table to indicate that the source chunk is unavailable on the source but that the data contained in the source chunk is available from a replicated shard that includes a replicated copy of the source chunk. The process 1300 may proceed to step 1308.

In step 1308, the shard director notifies the client applications about the update to the routing table. The notification will also include mapping data for the new mapping to indicate that the data contained in the source chunk can now be obtained from the replicated shard. This will therefore let the client applications know that they can continue to directly route queries to the replicated shard for queries that require access to the source chunk while the source chunk is unavailable on the source shard. This ensures that the client applications experience no downtime in accessing the data that they need form the source chunk while it is being migrated to the new destination shard. The process 1300 may then proceed to step 1310.

In step 1310, the shard director instructs the shards to copy the source chunk from the source shard to the destination shard. The process 1300 may then proceed to step 1320.

In step 1312, the shard director instructs the destination shard to store a fuzzy copy of the source chunk in the destination shard. A fuzzy copy is a copy that is made from the source chunk while the source chunk is still available for processing further queries. Thus, the fuzzy copy of the source chunk might not be identical to the source chunk if the source chunk is modified during the copying process. Any additional modifications or updates to the source chunk would not be reflected in the fuzzy copy. The process 1300 may then proceed to step 1314.

In step 1314, the process 1300 determines whether there have been additional changes to the source chunk on the source shard that have not been reflected din the fuzzy copy of the source chunk stored in the destination shard. If there are additional changed that have not been reflected in the fuzzy copy, the process 1300 may proceed to step 1316. IF there are no additional changes that have not been reflected in the fuzzy copy, then the source chunk and the fuzzy copy of the source chunk are now identical, and the process 1300 proceeds to step 1318.

In step 1316, the process 1300 copies any additional changes that were made to the source chunk but that have not been reflected in the fuzzy copy into the fuzzy copy. The process 1300 then returns to step 1314.

In step 1318, the fuzzy copy of the source chunk and the source chunk are now identical, so the shard director makes the source chunk on the source shard read-only. Thus, the source shard can still be used for read queries, but cannot be updated. The process then proceeds to step 1320.

In step 1320, the shard director updates the routing table to indicate that the source chunk is now available on the destination shard and is no longer available at the source shard. The process 1300 then proceeds to step 1322.

In step 1322, the shard director notifies the client applications that an update was made to the routing table. The shard director sends the updating mapping data from the routing table to indicate that the source chunk is now available at the destination shard instead of the source shard. Client applications can therefore use this updated mapping data included in the notification to direct route subsequent queries to the destination shard if the queries require access to data stored in the chunk. The process 1300 may then proceed to step 1324.

In step 1324, the shard director may instruct the source shard to delete the source chunk from the source shard, thus freeing up storage space on the source shard. The process 1300 may then end.

Routing Queries

Most of the queries in a typical OLTP client application are short and must be processed with millisecond latency. An extra network hop and parsing during routing of a query to an appropriate shard may introduce latency unacceptable for an OLTP client application. The present disclosure provides techniques for minimizing latency when routing queries sent from a client application.

Returning to FIG. 2, client application 210 will need to make data requests of sharded database 250. In some instances, a data request from client application 210 will require data from a single shard. Such data requests are called single-shard queries. Single shard queries will represent the majority of data requests for a typical OLTP client application, as the shards 260A, 260B, and 260C have been configured such that the chunks in each shard contain corresponding partitions of tables from a table family. Therefore, most queries that rely on data from a table family will likely be serviced by a single shard, as the related data for that table family is collocated on the same shard. Likewise, using duplicated tables for reference tables that are relatively small and/or static improves the likelihood of queries being processed as single-shard queries.

In other instances, a data request from client application 210 will require data from multiple shards. Such data requests are called cross-shard queries. Processing a cross-shard query is typically slower than processing a single-shard query, as it requires joining data from multiple shards. Cross-shard queries are typically used to generate reports and collect statistics that requires data from multiple shards. Such cross-shard queries are typically not as performance critical.

As described earlier, shard catalogue 230 maintains a routing table that maps a list of chunks hosted by each shard to ranges of hash values associated with each chunk. The routing table, thus, can be used to determine, for a sharding key value or sharding key value set, which shard contains the chunk that includes the data for the sharding key. In one embodiment, the routing table may further include mapping information for a combination of a sharding key and a supersharding key in the case that the database is sharded via composite sharding. Thus, in the case composite sharded database, the routing table cane be used to determine, for a given sharding key value set, which shard contains the chunk that includes the data for the sharding key value set.

In one embodiment, the routing table maintained by shard catalogue 230 is copied and accessible to a shard coordinator. A shard coordinator is a component that assists in routing queries to appropriate shards. In one embodiment, a shard coordinator is implemented as a part of a shard director 220. In another embodiment, a shard coordinator is implemented in the client application 210. In another embodiment, a shard coordinator is implemented on one or more of each individual shard 260 in a sharded database 250. In another embodiment, a shard coordinator is implemented as a component separate from the shard director 220 and the individual shards 260. For example, the shard coordinator may be implemented as a software component that is external to the shard director 220 and the individual shards 260. That software component may, in one embodiment, be a part of sharded database 250. In another embodiment, the software component may be external to sharded database 250. In one embodiment, the software component may be external to sharded database 250 and client application 210.

In one embodiment, the shard coordinator functionality may be distributed across multiple software components S1 through SN that exist between client application 210 and sharded database 250. Software components S1 through SN may have different accessibility to client application 210 and/or sharded database 260. Such accessibility reflects various communication characteristics, including, but not limited to, physical proximity, bandwidth, availability of computing resources, work load, and other characteristics that would affect the accessibility of the software components S1 through SN.

In one embodiment, Software component S1 may be more easily accessible to client application 210 than software component S2. Likewise, software component S2 may be more easily accessible to client application 210 than software component S3, and so forth. Thus, software component S1 is considered closest to the client application 210 as it is the most accessible to client application 210 and software component SN is considered furthest from client application 210 as it is least accessible to the client application 210. In one embodiment, when a database request is created at client application 210 that requires processing by a shard coordinator, the closest available software component to the client application 210 is used as the shard coordinator to attempt to process the database request. If the closest available software component to the client application 210 is unable to process the database request, the next closest software component is tried, and so forth, until the database request is successfully processed by a shard coordinator. For example, a software component may be unable to process the database request if it does not have sufficient mapping data to correctly route the database request. By using the closest available software component to the client application 210 to act as the shard coordinator that will process the database request, the system can provide improved performance in processing the request, as the closest available software component has improved accessibility compared to other software components.

Proxy-Based Query Routing for Single-Shard Query with Known Key

In one embodiment, client application 210 cannot directly route the query in a database request to a shard because it cannot independently determine what target shard(s) contain data needed to process the query. Client application 210 can use a shard coordinator to perform proxy-based routing to the destination shard(s).

Figure 14:
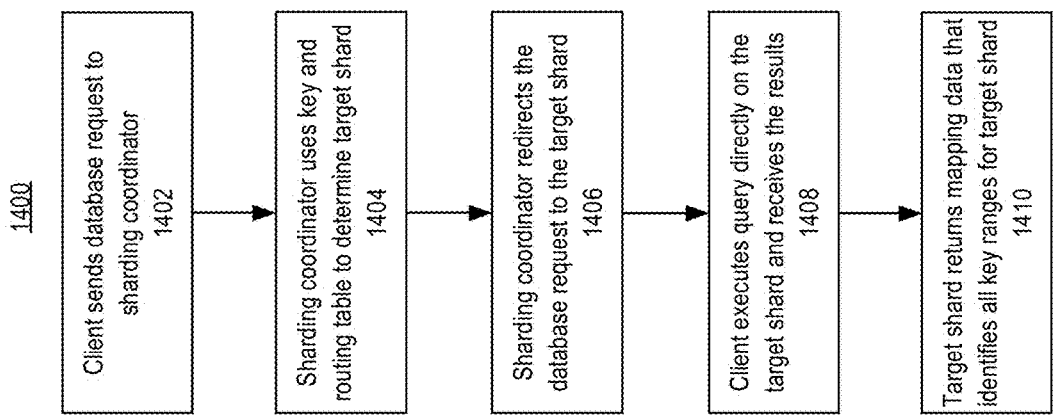
FIG. 14 is a flow diagram for a process of proxy-based query routing, according to one embodiment.

FIG. 14 shows a flow diagram for a process 1400 for proxy-based query routing for a single-shard query, according to one embodiment. In step 1402, client application 210 sends a database request that includes a single-shard query to a sharding coordinator. The database request includes a sharding key and optionally, may also include a supersharding key. The process 1400 then proceeds to step 1404.

In step 1404, the sharding coordinator may use the key and the routing table to determine which target shard contains data needed to process the single-shard query of the database request. The process 1400 then proceeds to step 1406.

In step 1406, the sharding coordinator redirects the client application 210 directly to the target shard containing the data needed to process the single-shard query. By redirecting the client application 210 to the target shard instead of merely returning the identification of the target shard to the client application 210, the process 1400 can remove an unnecessary hop in processing the single-shard query, thereby improving system latency. The process 1400 then proceeds to step 1408.

In step 1408, the client application 210 can execute the single-shard query directly on the target shard and receive the results of the query directly from the target shard. The process 1400 then proceeds to step 1410.

In step 1410, the target shard can optionally also return mapping data that identifies all key ranges the particular shard stores. This mapping data can be cached by the client application 210 directly or in a connection pool accessible to the client application 210. The mapping data will allow the client application 210 to directly route subsequent queries that have a sharding key that matches the cached mapping data to the target shard, without needing to consult the sharding coordinator. This will improve performance for subsequent database requests to the target shard. The process 1400 may then end.

Proxy-Based Query Routing for Unknown Sharding Keys

Figure 15:
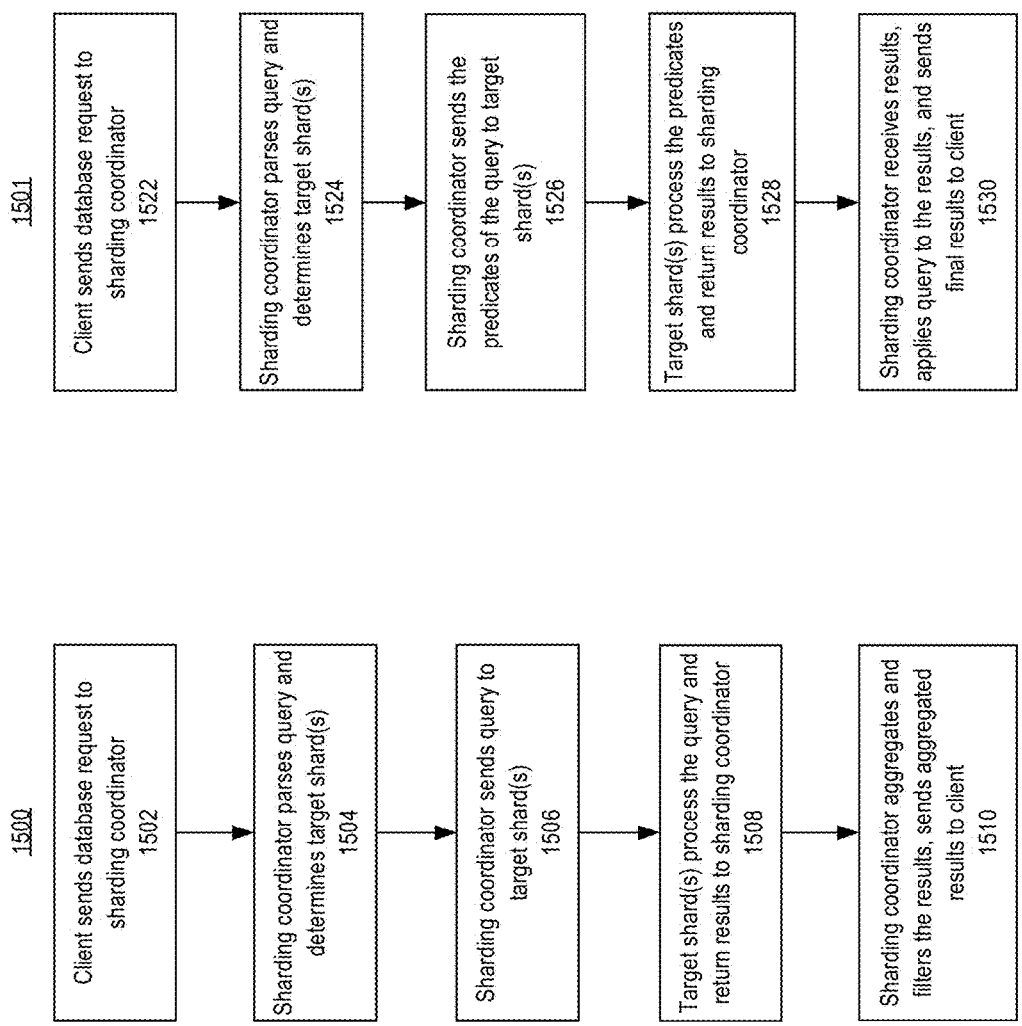
FIGS. 15A and 15B are a flows diagram for processes of proxy-based query routing, according to one embodiment.

FIG. 15 shows a flow diagram for a process 1500 for proxy-based query routing for when the database request sent by client application 210 does not include a sharding key. For example, this process 1500 may be used when a legacy client application is being used to accessed a sharded database and the database requests have not been updated to include the sharding key. Alternatively, this process 1500 may be used when a client application 210 is performing a cross-shard query that requires data from multiple shards.

In step 1502, client application 210 sends a database request that includes a query to a sharding coordinator that does not include a sharding key. The process 1500 then proceeds to step 1504.

In step 1504, the sharding coordinator parses the query in the database request and determines the values of the sharding keys for the query. The sharding coordinator can compare the sharding keys to a routing table to determine the target shard(s) that contain the data necessary to process the query. The process 1500 then proceeds to step 1506.

In step 1506, the sharding coordinator sends the query to each shard identified in step 1504. The process 1500 then proceeds to step 1508.

In step 1508, each of the shard(s) process the query and return the results of processing the query to the sharding coordinator. The process then proceeds to step 1510.

In step 1510, the sharding coordinator aggregates and filters the results from the shard(s) received in step 1508. Furthermore, the sharding coordinator returns the aggregated results to the client application 210. The process 1500 may then end.

In another embodiment, FIG. 15B shows a flow diagram for a process 1501 for proxy-based query routing for when the database request sent by client application 210 does not include a sharding key. In step 1522, client application 210 sends a database request that includes a query to a sharding coordinator that does not include a sharding key. The process 1501 then proceeds to step 1524.

In step 1524, the sharding coordinator parses the query in the database request and determines the values of the sharding keys for the query. The sharding coordinator can then compare the sharding keys against the routing table to determine the shard(s) that contain the data that is necessary to process the query. The process 1501 then proceeds to step 1526.

In step 1526, the sharding coordinator sends the predicates of the query to each shard identified in step 1524. The process 1501 then proceeds to step 1528.

In step 1528, each of the shard(s) process the predicates and send the predicate results to the sharding coordinator. The process then proceeds to step 1530.

In step 1530, the sharding coordinator receives the predicate results from the shard(s), then applies the query to the predicate results. The final results of applying the query to the predicate results can then be returned to the client application 210. The process 1501 may then end.

Direct Routing to Shard Using Cached Mapping Data

In one embodiment, a client application 210 can use cached mapping data to route a query directly to a particular shard 260. In this example, the client application 210 can use mapping data cached in the client application 210 or cached in a connection pool accessible to the client application 210 to determine which particular shard 260 contains data for a particular query. For example, when the client connection pool for the client application 210 connects to a particular shard for the first time, it may need to use a shard coordinator to route the first query, as the client application 210 does not know which particular shard is needed to process the first query. The particular shard can process the first query and return the response. In addition to providing the response to the first query, that particular shard returns mapping data that identifies all key ranges the particular shard stores. The client application 210 or a connection pool can cache the key range mappings for the particular shard.

The client application 210 can therefore use the cached mapping data to directly route queries to the particular shard without accessing an intermediate shard coordinator for subsequent queries that require data stored on the particular shard. Thus, the client application 210 can directly route the subsequent query to the particular shard in the case of a single-shard query, and return the results directly to the client application 210. Direct routing to a shard using a known key can provide improved latency, as the client application 210 can directly access the shard without having to consult an intermediate shard coordinator in order to process the query.

In one embodiment, when direct routing a query to a shard, a predicate for a query can be automatically added to the query to limit the query output by the shard to the provided key value(s). For example, if "cust_id=123" is specified when establishing a database connection, and then "SELECT * FROM customers" is executed over the database connection, the query can be rewritten as "SELECT * FROM customers where cust_id=123". The query can be rewritten by the client application, the connection pool, or the shard coordinator. This behavior is optional and may be controlled by a user-defined parameter for the sharded database.

Further details regarding direct routing of queries between client application 210 and a shard can be found in U.S. patent application Ser. No. 15/133,972 ("SYSTEM AND METHOD FOR PROVIDING DIRECT ACCESS TO A SHARDED DATABASE"), filed on Apr. 20, 2016, and U.S. patent application Ser. No. 15/133,979 ("SYSTEM AND METHOD FOR PROVIDING ACCESS TO A SHARDED DATABASE USING A CACHE AND A SHARD TECHNOLOGY"), filed on Apr. 20, 2016, the contents of each of which are incorporated by reference as if fully set forth herein.

Direct Routing to Shard Based on Client Parsing of Query

In one embodiment, client application 210 can parse a query in order to determine the shard(s) that need to be used to process the query, without consulting a shard coordinator. In one instance, a query that includes a "SELECT *" statement across a sharded table can be parsed by the client application 210. Based on the parsing, the client application 210 can recognize that the "SELECT *" statement will require data from all shards in a sharded database. Therefore, the client application 210 can directly route the query to all of the shards in the sharded database, rather than using an intermediate shard coordinator to route the query. For example, the client application 210 can directly route the query to all shards identified in cached mapping data accessible to the client application 210.

Combined Process for Query Routing

In one embodiment, the various proxy-based routing and direct routing techniques may be combined into a combined process for query routing that utilizes direct routing when the client application 210 is able to perform direct routing, and uses proxy-based routing when the client application 210 is unable to perform direct routing. This combined process provides the benefits of improved latency for direct routing, while preserving the ability to perform cross-shard queries using proxy-based routing and the ability to access shard(s) when a client application 210 does not know what shard(s) contain data necessary to process the query.

Figure 16:
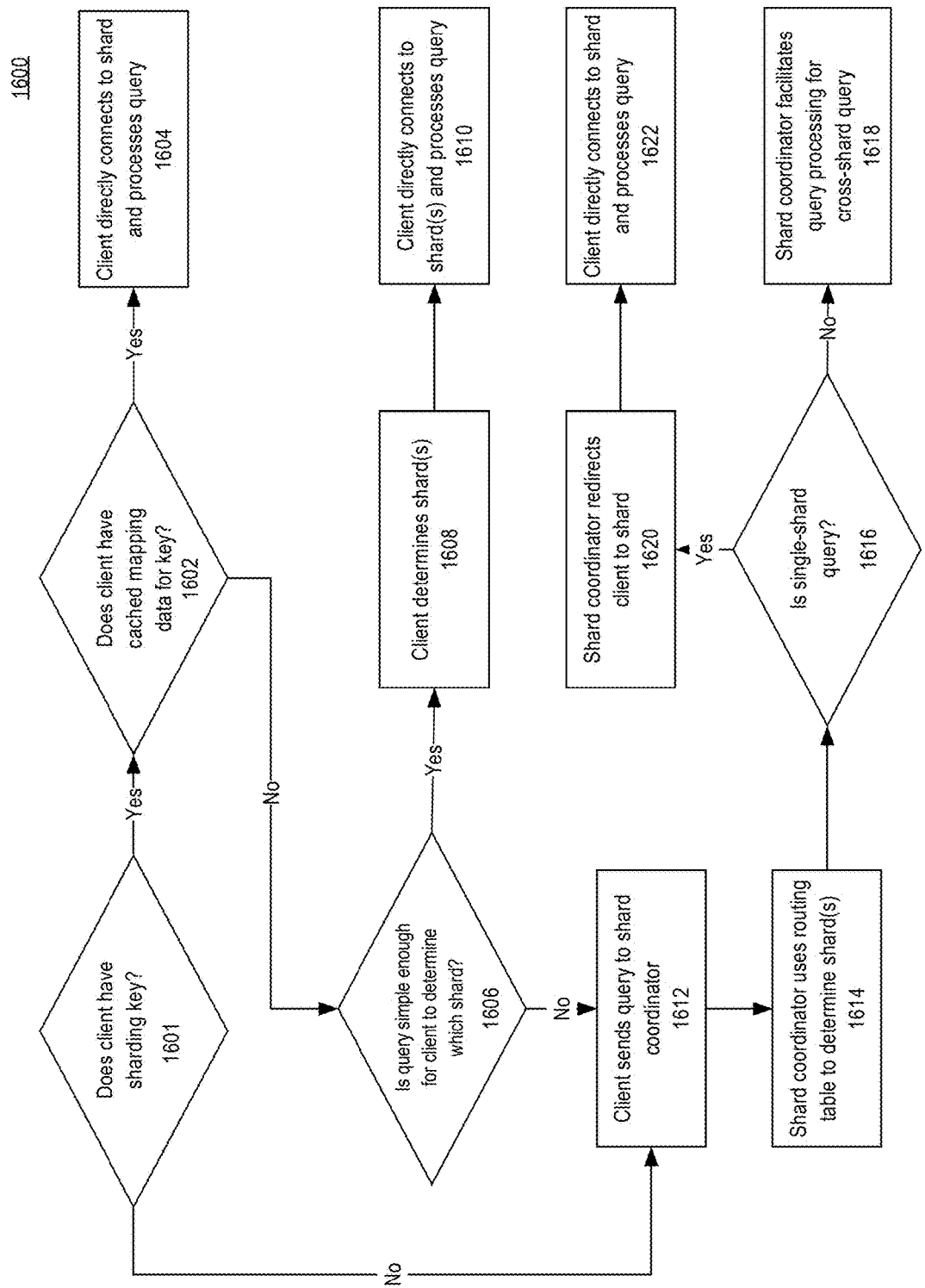
FIG. 16 is a flow diagram for a process of query-routing, according to one embodiment.

FIG. 16 illustrates an example flow diagram for a combined process for query routing. In step 1601, the client application 210 determines whether it has access to a sharding key or not. If the client application has access to a sharding key, the process 1600 may proceed to step 1602. If the client application 210 does not have access to a sharding key, the process 1600 may proceed to step 1612.

In step 1602, the client application 210 determines whether it has access to cached mapping data for the sharding key. The cached mapping data is mapping data that includes a range of key values for particular shard(s) in the sharded database. If the client application 210 is able to determine, from the cached mapping data using the sharding key, what shard(s) contain data that is necessary to process the query, the process 1600 may proceed to step 1604. If the client application 210 is unable to determine, from the cached mapping data using the sharding key, what shard(s) contain data that is necessary to process the query, the process 1600 may proceed to step 1606.

In step 1604, the client application 210 may directly connect to the shard(s) that contain data necessary to process the query and execute the query directly on the shard(s). The shard(s) return the result of the query directly to the client application 210. The process 1600 may then end.

In step 1606, the client application 210 may determine whether the query is simple enough to determine which shard(s) contain data necessary to process the query. For example, if the query includes a "SELECT *" statement, the client application 210 may determine that the query needs to be processed by all shard(s) in the sharded database. If the client application 210 determines that the query is simple enough, the process 1600 may proceed to step 1608, otherwise, the process 1600 may proceed to step 1612.

In step 1608, the client application 210 can analyze the query to determine what target shard(s) contain data necessary to process the query. The process 1600 may then proceed to step 1610.

In step 1610, the client application 210 may directly connect to the shard(s) that contain data necessary to process the query and execute the query directly on the shard(s). The shard(s) return the result of the query directly to the client application 210. The process 1600 may then end.

In step 1612, the client application 210 may send the query to a shard coordinator to assist with proxy-based routing of the query. The process 1600 may then proceed to step 1614.

In step 1614, the shard coordinator can analyze the query to determine the sharding key for the query. The shard coordinator can use the sharding key and the routing table to determine which shard(s) contain data that is necessary to process the query. The process 1600 may proceed to step 1616.

In step 1616, the shard coordinator can determine if the query is a single-shard query. If the query is a single-shard query the process 1600 may then proceed to step 1620. If the query is a cross-shard query, the process 1600 may then proceed to step 1618.

In step 1618, the shard coordinator facilitates query processing for the cross-shard query. In one embodiment, the shard coordinator will send the query to each of the target shard(s) and the target shard(s) will process the query. The target shard(s) will return the results to the shard coordinator, which will aggregate and filter the results. The shard coordinator will send the final aggregated results of the cross-shard query back to the client application 210. The process 1600 may then end.

In step 1620, the shard coordinator can redirect the client application 210 to the target shard that contains data necessary to process the single-shard query. The process 1600 may then proceed to step 1622.

In step 1622, the client application 210 may directly connect to the target shard and execute the query on the target shard. The results of executing the query are returned directly from the target shard to the client application 210. The process 1600 may then end.

Automatic Propagation of Schema Changes

Changes to a database schema can be made via a data definition language (DDL). With a large number of shards in a sharded database, it is important to have an efficient way to propagate schema changes across the sharded database. In some conventional sharded databases, database schema changes across a sharded database are done by application or scripting language that is manually written by a customer. The application code or scripting language is used to propagate schema changes across all shards in a sharded database by manually connecting to and applying the code or scripting language to each shard. Such application code or scripting languages are not as uniform or robust as DDL. Moreover, such code or scripting languages are prone to user error. In other sharded databases, database schema changes across a sharded database are done manually by a database administrator applying the DDL for the schema changes to each shard individually. This approach is undesirable, because some sharded databases include hundreds or thousands of shards, and such manual work by a database administrator is time-consuming and prone to error.

The present system provides for automatic propagation of database schema changes to shards in a sharded database using DDL. In one embodiment, the shard catalogue 230 can retain a history of schema modification instructions that have been received. Each schema modification instruction is written as a DDL request. Such DDL requests can be entered by the database administrator directly at the shard catalogue 230.

The shard catalogue 230 can maintain a historical log that indicates the status of applying DDL requests to each particular shard in the sharded database. Thus, the historical logic indicates which DDL requests have been applied to shards, and which DDL requests are pending being applied to shards. In some cases, a DDL request may have been applied to some shards, but not all shards. In one embodiment, the database administrator can indicate a schedule for when the pending DDL requests should be applied to the sharded database. The schedule can be sent to the shard director 220, and the shard director 220 can delay executing the pending DDL request until the time specified in the schedule.

In one embodiment, the shard catalogue 230 can push the pending DDL request to the shard director 220. The shard director 220 is responsible for applying the pending DDL request at the shards 260. The shard director 220 has access to the historical log that indicates which shards have applied any historical DDL requests as well as pending DDL requests.

The shard director 220 can act as a database client with relation to the shards 260. Thus, shard director 220 can receive the pending DDL request from the shard catalogue 230, connect to each of the shards 260, and execute the pending DDL request on each of the shards 260. In one embodiment, the execution of the schema changes on each shard is performed in parallel. In one embodiment, the shards 260 can return a status message to the shard director 220 to indicate whether the pending DDL request was successfully executed on the given shard. The shard director 220 can relay the received status messages to the shard catalogue 230, so that the database administrator can view them. Likewise, the historical log can be updated to indicate whether the DDL request was successfully applied or not to a particular shard.

In one embodiment, the shard director 220 can act as a listener that can receive notifications that provide status information from the shards 260. Status information could include whether the shard is available or unavailable. In one embodiment, the shard director 220 can delay applying the pending a DDL request to a shard until the shard is available.

For example, if a sharded database has three shards A, B, and C. Shards A and B are available, but shard C is unavailable. The shard director 220 can immediately apply a DDL request to Shards A and B and update the historical log accordingly. The shard director can then wait until Shard C is available, as it will receive status updates from Shard C when it becomes available. As soon as Shard C becomes available, shard director 220 can use the historical log to determine all the pending DDL requests that have yet to be applied to Shard C, and apply them sequentially until the schema of Shard C is fully updated with all schema modification instructions that are outstand.

In another embodiment, the status information could include an indication as to the workload being experienced by the shard. In one embodiment, the shard director 220 can delay applying the pending DDL request to the shards until all shards in the sharded database have a workload that is less than a threshold setting. By delaying applying the pending DDL, the shard director 220 can ensure that the DDL is only applied to the shards in the sharded database when the performance impact is acceptable.

When shard director 220 executes a given DDL request on a shard in a sharded database, the shard has sufficient metadata stored on it to recognize that the shard is merely one database instance in a larger sharded database. Thus, the shard can execute the DDL request by only implementing the portions of the DDL request that would affect the shard. For example, say that the DDL request is a "CREATE SHARDED TABLE" request. In a normal database instance, a "CREATE TABLE" request would create a fully-formed standalone database table along with relevant metadata for the table data object. However, in a shard in the present system, when it receives a "CREATE SHARDED TABLE" DDL request, instead of creating a fully-formed standalone database table, the shard can use the stored metadata regarding the configuration of the sharded database as a whole to create the partitions of the sharded table that will be stored in chunks found on the shard itself, without having to create the rest of the table that are going to be stored in chunks located on different shards. In this way, the DDL propagation can improve system performance, by allowing shards to only execute the parts of the DDL request that affect their own shard, without having to execute the entirety of the DDL request.

This system allows a database administrator to automatically make schema changes across a large set of shards in a sharded database. The database administrator merely needs to supply the DDL specifying the schema changes to the shard catalogue, and those changes will be automatically propagated to each of the shards in the sharded database for execution. This does not application code or scripting to propagate the DDL requests, nor does it require the database administrator manually connecting to each individual shard to propagate the DDL schema changes.

Syntax

Although this disclosure provides various examples of syntax for how to create, manage, and manipulate a sharded database, these examples are merely illustrative. The present system can be implemented using existing relational database coding languages or query languages, such as structured query language (SQL). This means that legacy systems can be easily upgraded, migrated, or connected to a system that includes the sharded database teaching described herein, as there will not require significant changes to SQL. Data manipulation language (DML) usage does not require any changes to utilize the benefits of the present system. Furthermore, DDL usage only requires minor changes to support keywords necessary to implement the sharding organization of the sharded database.

Database Overview

Embodiments of the present invention are used in the context of database management systems (DBMSs). Therefore, a description of an example DBMS is provided.

Generally, a server, such as a database server, is a combination of integrated software components and an allocation of computational resources, such as memory, a node, and processes on the node for executing the integrated software components, where the combination of the software and computational resources are dedicated to providing a particular type of function on behalf of clients of the server. A database server governs and facilitates access to a particular database, processing requests by clients to access the database.

A database comprises data and metadata that is stored on a persistent memory mechanism, such as a set of hard disks. Such data and metadata may be stored in a database logically, for example, according to relational and/or object-relational database constructs.

Users interact with a database server of a DBMS by submitting to the database server commands that cause the database server to perform operations on data stored in a database. A user may be one or more applications running on a client computer that interact with a database server. Multiple users may also be referred to herein collectively as a user.

A database command may be in the form of a database statement. For the database server to process the database statements, the database statements must conform to a database language supported by the database server. One non-limiting example of a database language that is supported by many database servers is SQL, including proprietary forms of SQL supported by such database servers as Oracle, (e.g. Oracle Database 11g). SQL data definition language ("DDL") instructions are issued to a database server to create or configure database objects, such as tables, views, or complex types. Data manipulation language ("DML") instructions are issued to a DBMS to manage data stored within a database structure. For instance, SELECT, INSERT, UPDATE, and DELETE are common examples of DML instructions found in some SQL implementations. SQL/XML is a common extension of SQL used when manipulating XML data in an object-relational database.

Generally, data is stored in a database in one or more data containers, each container contains records, and the data within each record is organized into one or more fields. In relational database systems, the data containers are typically referred to as tables, the records are referred to as rows, and the fields are referred to as columns. In object-oriented databases, the data containers are typically referred to as object classes, the records are referred to as objects, and the fields are referred to as attributes. Other database architectures may use other terminology. Systems that implement the present invention are not limited to any particular type of data container or database architecture. However, for the purpose of explanation, the examples and the terminology used herein shall be that typically associated with relational or object-relational databases. Thus, the terms "table", "row" and "column" shall be used herein to refer respectively to the data container, record, and field.

A multi-node database management system is made up of interconnected nodes that share access to the same database. Typically, the nodes are interconnected via a network and share access, in varying degrees, to shared storage, e.g. shared access to a set of disk drives and data blocks stored thereon. The nodes in a multi-node database system may be in the form of a group of computers (e.g. work stations, personal computers) that are interconnected via a network. Alternately, the nodes may be the nodes of a grid, which is composed of nodes in the form of server blades interconnected with other server blades on a rack.

Each node in a multi-node database system hosts a database server. A server, such as a database server, is a combination of integrated software components and an allocation of computational resources, such as memory, a node, and processes on the node for executing the integrated software components on a processor, the combination of the software and computational resources being dedicated to performing a particular function on behalf of one or more clients.

Resources from multiple nodes in a multi-node database system can be allocated to running a particular database server's software. Each combination of the software and allocation of resources from a node is a server that is referred to herein as a "server instance" or "instance". A database server may comprise multiple database instances, some or all of which are running on separate computers, including separate server blades.

Query Optimization and Execution Plans

Query optimization generates one or more different candidate execution plans for a query, which are evaluated by the query optimizer to determine which execution plan should be used to compute the query.

Execution plans may be represented by a graph of interlinked nodes, referred to herein as operators or row sources, that each corresponds to a step of an execution plan, referred to herein as an execution plan operation. The hierarchy of the graphs (i.e., directed tree) represents the order in which the execution plan operations are performed and how data flows between each of the execution plan operations. An execution plan operator generates a set of rows (which may be referred to as a table) as output and execution plan operations include, for example, a table scan, an index scan, sort-merge join, nested-loop join, filter, and importantly, a full outer join.

A query optimizer may optimize a query by transforming the query. In general, transforming a query involves rewriting a query into another semantically equivalent query that should produce the same result and that can potentially be executed more efficiently, i.e. one for which a potentially more efficient and less costly execution plan can be generated. Examples of query transformation include view merging, subquery unnesting, predicate move-around and pushdown, common subexpression elimination, outer-to-inner join conversion, materialized view rewrite, and star transformation.

Hardware Overview

Figure 17:
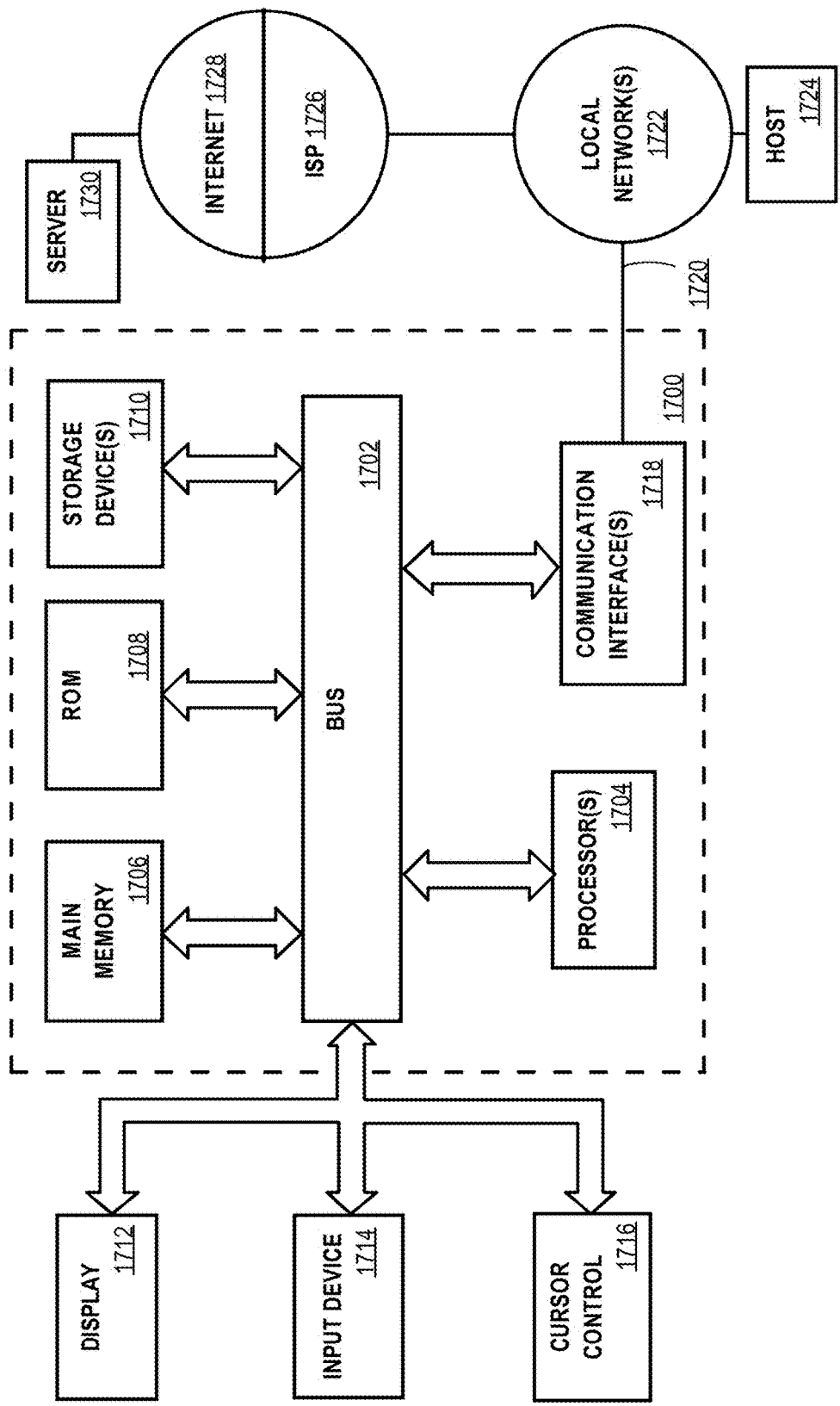
FIG. 17 is a block diagram of a computing device in which the example embodiment(s) of the present invention may be embodied.

Referring now to FIG. 17, it is a block diagram that illustrates a basic computing device 1700 in which the example embodiment(s) of the present invention may be embodied. Computing device 1700 and its components, including their connections, relationships, and functions, is meant to be exemplary only, and not meant to limit implementations of the example embodiment(s). Other computing devices suitable for implementing the example embodiment(s) may have different components, including components with different connections, relationships, and functions.

Computing device 1700 may include a bus 1702 or other communication mechanism for addressing main memory 1706 and for transferring data between and among the various components of device 1700.

Computing device 1700 may also include one or more hardware processors 1704 coupled with bus 1702 for processing information. A hardware processor 1704 may be a general purpose microprocessor, a system on a chip (SoC), or other processor.

Main memory 1706, such as a random access memory (RAM) or other dynamic storage device, also may be coupled to bus 1702 for storing information and software instructions to be executed by processor(s) 1704. Main memory 1706 also may be used for storing temporary variables or other intermediate information during execution of software instructions to be executed by processor(s) 1704.

Software instructions, when stored in storage media accessible to processor(s) 1704, render computing device 1700 into a special-purpose computing device that is customized to perform the operations specified in the software instructions. The terms "software", "software instructions", "computer program", "computer-executable instructions", and "processor-executable instructions" are to be broadly construed to cover any machine-readable information, whether or not human-readable, for instructing a computing device to perform specific operations, and including, but not limited to, application software, desktop applications, scripts, binaries, operating systems, device drivers, boot loaders, shells, utilities, system software, JAVASCRIPT, web pages, web applications, plugins, embedded software, microcode, compilers, debuggers, interpreters, virtual machines, linkers, and text editors.

Computing device 1700 also may include read only memory (ROM) 1708 or other static storage device coupled to bus 1702 for storing static information and software instructions for processor(s) 1704.

One or more mass storage devices 1710 may be coupled to bus 1702 for persistently storing information and software instructions on fixed or removable media, such as magnetic, optical, solid-state, magnetic-optical, flash memory, or any other available mass storage technology. The mass storage may be shared on a network, or it may be dedicated mass storage. Typically, at least one of the mass storage devices 1710 (e.g., the main hard disk for the device) stores a body of program and data for directing operation of the computing device, including an operating system, user application programs, driver and other support files, as well as other data files of all sorts.

Computing device 1700 may be coupled via bus 1702 to display 1712, such as a liquid crystal display (LCD) or other electronic visual display, for displaying information to a computer user. In some configurations, a touch sensitive surface incorporating touch detection technology (e.g., resistive, capacitive, etc.) may be overlaid on display 1712 to form a touch sensitive display for communicating touch gesture (e.g., finger or stylus) input to processor(s) 1704.

An input device 1714, including alphanumeric and other keys, may be coupled to bus 1702 for communicating information and command selections to processor 1704. In addition to or instead of alphanumeric and other keys, input device 1714 may include one or more physical buttons or switches such as, for example, a power (on/off) button, a "home" button, volume control buttons, or the like.

Another type of user input device may be a cursor control 1716, such as a mouse, a trackball, or cursor direction keys for communicating direction information and command selections to processor 1704 and for controlling cursor movement on display 1712. This input device typically has two degrees of freedom in two axes, a first axis (e.g., x) and a second axis (e.g., y), that allows the device to specify positions in a plane.

While in some configurations, such as the configuration depicted in FIG. 17, one or more of display 1712, input device 1714, and cursor control 1716 are external components (i.e., peripheral devices) of computing device 1700, some or all of display 1712, input device 1714, and cursor control 1716 are integrated as part of the form factor of computing device 1700 in other configurations.

Functions of the disclosed systems, methods, and modules may be performed by computing device 1700 in response to processor(s) 1704 executing one or more programs of software instructions contained in main memory 1706. Such software instructions may be read into main memory 1706 from another storage medium, such as storage device(s) 1710. Execution of the software instructions contained in main memory 1706 cause processor(s) 1704 to perform the functions of the example embodiment(s).

While functions and operations of the example embodiment(s) may be implemented entirely with software instructions, hard-wired or programmable circuitry of computing device 1700 (e.g., an ASIC, a FPGA, or the like) may be used in other embodiments in place of or in combination with software instructions to perform the functions, according to the requirements of the particular implementation at hand.

The term "storage media" as used herein refers to any non-transitory media that store data and/or software instructions that cause a computing device to operate in a specific fashion. Such storage media may comprise non-volatile media and/or volatile media. Non-volatile media includes, for example, non-volatile random access memory (NVRAM), flash memory, optical disks, magnetic disks, or solid-state drives, such as storage device 1710. Volatile media includes dynamic memory, such as main memory 1706. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, flash memory, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1702. Transmission media can also take the form of acoustic or light waves, such as those generated during radio-wave and infra-red data communications.

Various forms of media may be involved in carrying one or more sequences of one or more software instructions to processor(s) 1704 for execution. For example, the software instructions may initially be carried on a magnetic disk or solid-state drive of a remote computer. The remote computer can load the software instructions into its dynamic memory and send the software instructions over a telephone line using a modem. A modem local to computing device 1700 can receive the data on the telephone line and use an infra-red transmitter to convert the data to an infra-red signal. An infra-red detector can receive the data carried in the infra-red signal and appropriate circuitry can place the data on bus 1702. Bus 1702 carries the data to main memory 1706, from which processor(s) 1704 retrieves and executes the software instructions. The software instructions received by main memory 1706 may optionally be stored on storage device(s) 1710 either before or after execution by processor(s) 1704.

Computing device 1700 also may include one or more communication interface(s) 1718 coupled to bus 1702. A communication interface 1718 provides a two-way data communication coupling to a wired or wireless network link 1720 that is connected to a local network 1722 (e.g., Ethernet network, Wireless Local Area Network, cellular phone network, Bluetooth wireless network, or the like). Communication interface 1718 sends and receives electrical, electromagnetic, or optical signals that carry digital data streams representing various types of information. For example, communication interface 1718 may be a wired network interface card, a wireless network interface card with an integrated radio antenna, or a modem (e.g., ISDN, DSL, or cable modem).

Network link(s) 1720 typically provide data communication through one or more networks to other data devices. For example, a network link 1720 may provide a connection through a local network 1722 to a host computer 1724 or to data equipment operated by an Internet Service Provider (ISP) 1726. ISP 1726 in turn provides data communication services through the world wide packet data communication network now commonly referred to as the "Internet" 1728. Local network(s) 1722 and Internet 1728 use electrical, electromagnetic or optical signals that carry digital data streams. The signals through the various networks and the signals on network link(s) 1720 and through communication interface(s) 1718, which carry the digital data to and from computing device 1700, are example forms of transmission media.

Computing device 1700 can send messages and receive data, including program code, through the network(s), network link(s) 1720 and communication interface(s) 1718. In the Internet example, a server 1730 might transmit a requested code for an application program through Internet 1728, ISP 1726, local network(s) 1722 and communication interface(s) 1718.

The received code may be executed by processor 1704 as it is received, and/or stored in storage device 1710, or other non-volatile storage for later execution.

Software Overview

Figure 18:
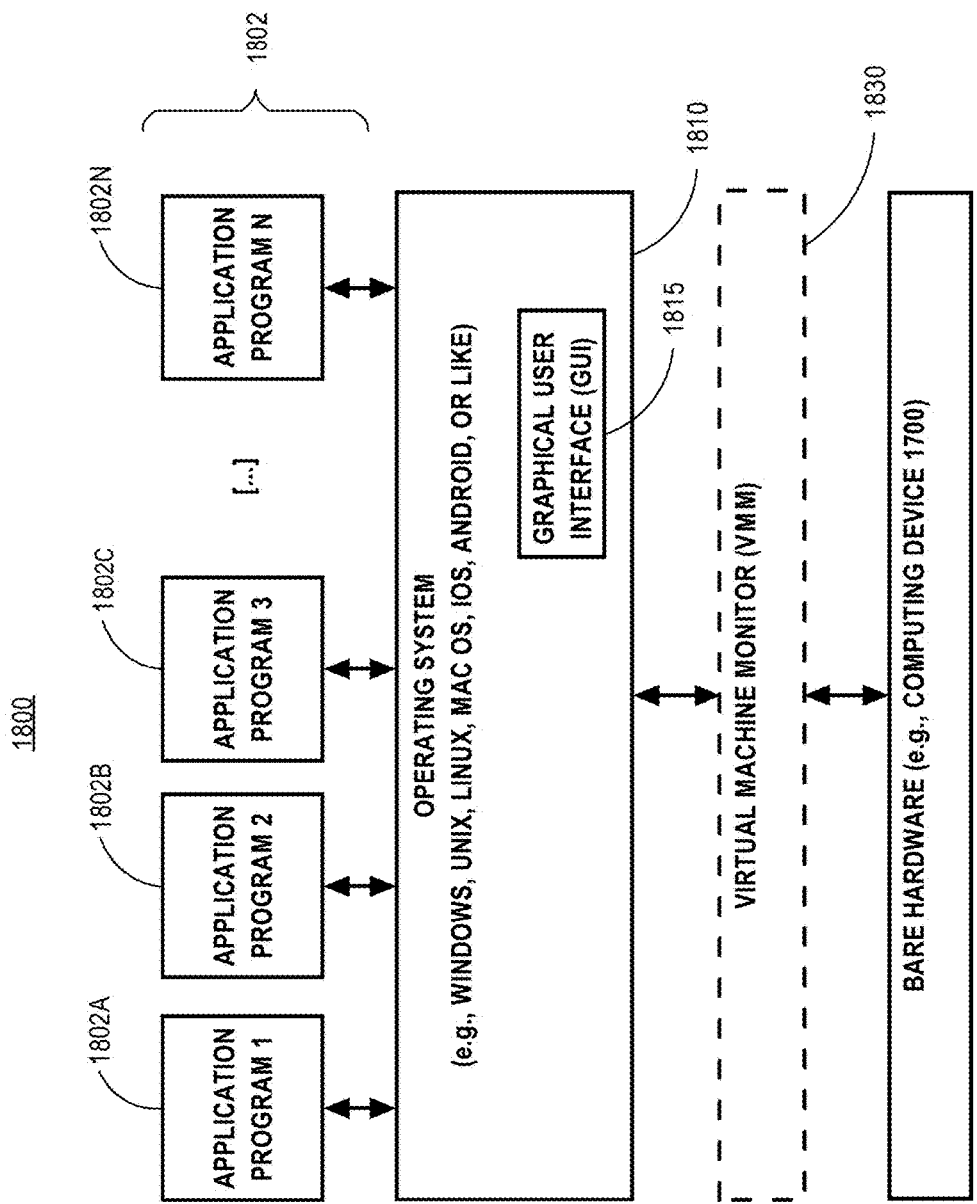
FIG. 18 is a block diagram of a basic software system for controlling the operation of the computing device.

FIG. 18 is a block diagram of a basic software system 1800 that may be employed for controlling the operation of computing device 1700. Software system 1800 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 1800 is provided for directing the operation of computing device 1700. Software system 1800, which may be stored in system memory (RAM) 1706 and on fixed storage (e.g., hard disk or flash memory) 1710, includes a kernel or operating system (OS) 1810.

The OS 1810 manages low-level aspects of computer operation, including managing execution of processes, memory allocation, file input and output (I/O), and device I/O. One or more application programs, represented as 1802A, 1802B, 1802C ... 1802N, may be "loaded" (e.g., transferred from fixed storage 1710 into memory 1706) for execution by the system 1800. The applications or other software intended for use on device 1800 may also be stored as a set of downloadable computer-executable instructions, for example, for downloading and installation from an Internet location (e.g., a Web server, an app store, or other online service).

Software system 1800 includes a graphical user interface (GUI) 1815, for receiving user commands and data in a graphical (e.g., "point-and-click" or "touch gesture") fashion. These inputs, in turn, may be acted upon by the system 1800 in accordance with instructions from operating system 1810 and/or application(s) 1802. The GUI 1815 also serves to display the results of operation from the OS 1810 and application(s) 1802, whereupon the user may supply additional inputs or terminate the session (e.g., log off).

OS 1810 can execute directly on the bare hardware 1820 (e.g., processor(s) 1704) of device 1700. Alternatively, a hypervisor or virtual machine monitor (VMM) 1830 may be interposed between the bare hardware 1820 and the OS 1810. In this configuration, VMM 1830 acts as a software "cushion" or virtualization layer between the OS 1810 and the bare hardware 1820 of the device 1700.

VMM 1830 instantiates and runs one or more virtual machine instances ("guest machines"). Each guest machine comprises a "guest" operating system, such as OS 1810, and one or more applications, such as application(s) 1802, designed to execute on the guest operating system. The VMM 1830 presents the guest operating systems with a virtual operating platform and manages the execution of the guest operating systems.

In some instances, the VMM 1830 may allow a guest operating system to run as if it is running on the bare hardware 1820 of device 1700 directly. In these instances, the same version of the guest operating system configured to execute on the bare hardware 1820 directly may also execute on VMM 1830 without modification or reconfiguration. In other words, VMM 1830 may provide full hardware and CPU virtualization to a guest operating system in some instances.

In other instances, a guest operating system may be specially designed or configured to execute on VMM 1830 for efficiency. In these instances, the guest operating system is "aware" that it executes on a virtual machine monitor. In other words, VMM 1830 may provide para-virtualization to a guest operating system in some instances.

The above-described basic computer hardware and software is presented for purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

EXTENSIONS AND ALTERNATIVES

Although some of the figures described in the foregoing specification include flow diagrams with steps that are shown in an order, the steps may be performed in any order, and are not limited to the order shown in those flowcharts. Additionally, some steps may be optional, may be performed multiple times, and/or may be performed by different components. All steps, operations and functions of a flow diagram that are described herein are intended to indicate operations that are performed using programming in a special-purpose computer or general-purpose computer, in various embodiments. In other words, each flow diagram in this disclosure, in combination with the related text herein, is a guide, plan or specification of all or part of an algorithm for programming a computer to execute the functions that are described. The level of skill in the field associated with this disclosure is known to be high, and therefore the flow diagrams and related text in this disclosure have been prepared to convey information at a level of sufficiency and detail that is normally expected in the field when skilled persons communicate among themselves with respect to programs, algorithms and their implementation.

In the foregoing specification, the example embodiment(s) of the present invention have been described with reference to numerous specific details. However, the details may vary from implementation to implementation according to the requirements of the particular implement at hand. The example embodiment(s) are, accordingly, to be regarded in an illustrative rather than a restrictive sense.

The invention claimed is:

1. A method, comprising:
maintaining, by a shard catalogue, schema data that indicates a schema that is used by each shard, of a plurality of shards, of a sharded database;
wherein each shard, of the plurality of shards, is a distinct relational database server;
wherein the shard catalogue is a special database that is used to store configuration data for the sharded database;
receiving schema modification instructions for modifying the schema;
in response to receiving the schema modification instructions, automatically performing:
updating, at the shard catalogue, the schema data based on the schema modification instructions; and
causing the respective relational database servers of all shards of the plurality of shards to modify the schema by, for each particular shard of the plurality of shards:
creating a database connection with the respective relational database server of the particular shard;
sending the schema modification instructions to the respective relational database server of the particular shard; and
executing the schema modification instructions within the respective relational database server of the particular shard.

2. The method of claim 1, wherein each relational database server of the sharded database does not share processors, memory, or disk storage with other relational database servers of the sharded database.

3. The method of claim 1, wherein the schema modification instructions are written in a data definition language (DDL).

4. The method of claim 1, further comprising sending the schema modification instructions from the shard catalogue to a shard director.

5. The method of claim 4, further comprising:
for each particular shard of the plurality of shards:
after executing the schema modification instructions on the particular shard, sending, from the particular shard to the shard director, a notification that indicates a status of executing the schema modification instructions on the particular shard; and updating, by the shard director, the schema data to indicate the status of executing the schema modification instructions on the particular shard.

6. A method, comprising:

maintaining, by a shard catalogue, schema data that indicates a schema that is used by each shard, of a plurality of shards, of a sharded database;

wherein each shard, of the plurality of shards, is a distinct relational database server;

wherein the shard catalogue is a special database that is used to store configuration data for the sharded database;

receiving schema modification instructions for modifying the schema;

in response to receiving the schema modification instructions, automatically performing:

updating, at the shard catalogue, the schema data based on the schema modification instructions;

sending the schema modification instructions from the shard catalogue to a shard director, for each particular shard of the plurality of shards:

after executing the schema modification instructions on the particular shard, sending, from the particular shard to the shard director, a notification that indicates a status of executing the schema modification instructions on the particular shard; and updating, by the shard director, the schema data to indicate the status of executing the schema modification instructions on the particular shard;

in response to detecting, by the shard director, that a first shard is unavailable, deferring the execution of the schema modification instructions on the first shard; and causing the respective relational database servers of all shards of the plurality of shards to modify the schema by, for each particular shard of the plurality of shards:

creating a database connection with the respective relational database server of the particular shard;

sending the schema modification instructions to the respective relational database server of the particular shard;

executing the schema modification instructions within the respective relational database server of the particular shard.

7. The method of claim 6, further comprising:

in response to detecting, by the shard director, that the first shard is available, performing the execution of the schema modification instructions on the first shard.

8. The method of claim 1, wherein the schema modification instructions comprise instructions for creating a sharded table; and wherein executing the schema modification instructions on the particular shard comprises creating, by the particular shard, a partition of the sharded table to be stored in a chunk of data on the particular shard without creating a complete sharded table on the particular shard.

9. The method of claim 1, further comprising:

receiving, by a shard director, notification statuses from the plurality of shards regarding a workload of each particular shard; and for each particular shard of the plurality of shards:

performing the steps of creating a database connection, sending the schema modification instructions to the particular shard, and executing the schema modification instructions only when the workload of each particular shard is below a threshold workload setting.

10. The method of claim 1, wherein the causing all shards of the plurality of shards to modify the schema is performed in parallel for each shard of the plurality of shards.

11. One or more non-transitory computer-readable media storing instructions, wherein the instructions include:

instructions which, when executed by one or more hardware processors, cause maintaining, by a shard catalogue, schema data that indicates a schema that is used by each shard, of a plurality of shards, of a sharded database;

wherein each shard, of the plurality of shards, is a distinct relational database server;

wherein the shard catalogue is a special database that is used to store configuration data for the sharded database;

instructions which, when executed by one or more hardware processors, cause receiving schema modification instructions for modifying the schema;

instructions which, when executed by one or more hardware processors, cause in response to receiving the schema modification instructions, automatically performing:

instructions which, when executed by one or more hardware processors, cause updating, at the shard catalogue, the schema data based on the schema modification instructions; and instructions which, when executed by one or more hardware processors, cause causing the respective relational database servers of all shards of the plurality of shards to modify the schema by, for each particular shard of the plurality of shards:

instructions which, when executed by one or more hardware processors, cause creating a database connection with the respective relational database server of the particular shard;

instructions which, when executed by one or more hardware processors, cause sending the schema modification instructions to the respective relational database server of the particular shard; and instructions which, when executed by one or more hardware processors, cause executing the schema modification instructions within the respective relational database server of the particular shard.

12. The one or more non-transitory computer-readable media of claim 11, wherein each relational database server of the sharded database does not share processors, memory, or disk storage with other relational database servers of the sharded database.

13. The one or more non-transitory computer-readable media of claim 11, wherein the schema modification instructions are written in a data definition language (DDL).

14. The one or more non-transitory computer-readable media of claim 11, further comprising instructions which, when executed by one or more hardware processors, cause sending the schema modification instructions from the shard catalogue to a shard director.

15. The one or more non-transitory computer-readable media of claim 14, further comprising:

for each particular shard of the plurality of shards:

instructions which, when executed by one or more hardware processors, cause, after executing the schema modification instructions on the particular shard, sending, from the particular shard to the shard director, a notification that indicates a status of executing the schema modification instructions on the particular shard; and instructions which, when executed by one or more hardware processors, cause, updating, by the shard director, the schema data to indicate the status of executing the schema modification instructions on the particular shard.

16. The one or more non-transitory computer-readable media storing instructions, wherein the instructions include:

instructions which, when executed by one or more hardware processors, cause maintaining, by a shard catalogue, schema data that indicates a schema that is used by each shard, of a plurality of shards, of a sharded database;

wherein each shard, of the plurality of shards, is a distinct relational database server;

wherein the shard catalogue is a special database that is used to store configuration data for the sharded database;

instructions which, when executed by one or more hardware processors, cause receiving schema modification instructions for modifying the schema;

instructions which, when executed by one or more hardware processors, cause in response to receiving the schema modification instructions, automatically performing:

instructions which, when executed by one or more hardware processors, cause updating, at the shard catalogue, the schema data based on the schema modification instructions;

instructions which, when executed by one or more hardware processors, cause sending the schema modification instructions from the shard catalogue to a shard director, for each particular shard of the plurality of shards:

instructions which, when executed by one or more hardware processors, cause, after executing the schema modification instructions on the particular shard, sending, from the particular shard to the shard director, a notification that indicates a status of executing the schema modification instructions on the particular shard; and instructions which, when executed by one or more hardware processors, cause, updating, by the shard director, the schema data to indicate the status of executing the schema modification instructions on the particular shard;

instructions which, when executed by one or more hardware processors, cause, in response to detecting, by the shard director, that a first shard is unavailable, deferring the execution of the schema modification instructions on the first shard; and instructions which, when executed by one or more hardware processors, cause causing the respective relational database servers of all shards of the plurality of shards to modify the schema by, for each particular shard of the plurality of shards:

instructions which, when executed by one or more hardware processors, cause creating a database connection with the respective relational database server of the particular shard;

instructions which, when executed by one or more hardware processors, cause sending the schema modification instructions to the respective relational database server of the particular shard; and instructions which, when executed by one or more hardware processors, cause executing the schema modification instructions within the respective relational database server of the particular shard.

17. The one or more non-transitory computer-readable media of claim 16, further comprising:

instructions which, when executed by one or more hardware processors, cause, in response to detecting, by the shard director, that the first shard is available, performing the execution of the schema modification instructions on the first shard.

18. The one or more non-transitory computer-readable media of claim 11, wherein the schema modification instructions comprise instructions for creating a sharded table; and wherein the instructions for executing the schema modification instructions on the particular shard comprises instructions which, when executed by one or more hardware processors, cause, creating, by the particular shard, a partition of the sharded table to be stored in a chunk of data on the particular shard without creating a complete sharded table on the particular shard.

19. The one or more non-transitory computer-readable media of claim 11, further comprising:

instructions which, when executed by one or more hardware processors, cause receiving, by a shard director, notification statuses from the plurality of shards regarding a workload of each particular shard; and for each particular shard of the plurality of shards:

instructions which, when executed by one or more hardware processors, cause performing the steps of creating a database connection, sending the schema modification instructions to the particular shard, and executing the schema modification instructions only when the workload of each particular shard is below a threshold workload setting.

20. The one or more non-transitory computer-readable media of claim 11 wherein the instructions which, when executed by one or more hardware processors, cause causing all shards of the plurality of shards to modify the schema is performed in parallel for each shard of the plurality of shards.

* * * * *

UNITED STATES PATENT AND TRADEMARK OFFICE
CERTIFICATE OF CORRECTION

PATENT NO. : 10,496,614 B2  
APPLICATION NO. : 15/268318  
DATED : December 3, 2019  
INVENTOR(S) : Hu et al.

Page 1 of 1

It is certified that error appears in the above-identified patent and that said Letters Patent is hereby corrected as shown below:

On the Title Page

Column 1, under title, Line 1, delete "SHARED" and insert -- SHARDED --, therefor.

In the Specification

In Column 1, Line 1, delete "SHARED" and insert -- SHARDED --, therefor.

In Column 9, Line 51, delete "partion_1" and insert -- partition_1 --, therefor.

Signed and Sealed this  
Sixteenth Day of March, 2021

Drew Hirshfeld  
*Performing the Functions and Duties of the*  
*Under Secretary of Commerce for Intellectual Property and*  
*Director of the United States Patent and Trademark Office*